United States Patent
Kitano et al.

(10) Patent No.: US 7,781,534 B2
(45) Date of Patent: *Aug. 24, 2010

(54) PROCESS FOR PRODUCING VINYL POLYMER, VINYL POLYMER, AND CURABLE COMPOSITION

(75) Inventors: Kenichi Kitano, Settsu (JP); Akihisa Hirota, Settsu (JP); Masanao Takeda, Settsu (JP); Kosuke Tanaka, Settsu (JP); Yoshiki Nakagawa, Settsu (JP); Shigeru Hagimori, Settsu (JP); Naoki Furukawa, Settsu (JP); Shigeki Ono, Settsu (JP); Nao Fujita, Settsu (JP)

(73) Assignee: Kaneka Corporation, Kita-ku, Osaka-shi (JP)

( * ) Notice: Subject to any disclaimer, the term of this patent is extended or adjusted under 35 U.S.C. 154(b) by 46 days.

This patent is subject to a terminal disclaimer.

(21) Appl. No.: 11/987,469

(22) Filed: Nov. 30, 2007

(65) Prior Publication Data

US 2008/0160621 A1    Jul. 3, 2008

Related U.S. Application Data

(62) Division of application No. 10/501,023, filed as application No. PCT/JP03/00450 on Jan. 21, 2003, now Pat. No. 7,323,519.

(30) Foreign Application Priority Data

Jan. 21, 2002  (JP) ............................... 2002-011265
Jan. 30, 2002  (JP) ............................... 2002-021009

(51) Int. Cl.
 *C08J 3/28* (2006.01)
 *C08C 2/04* (2006.01)
 *C08C 19/25* (2006.01)
(52) U.S. Cl. .................. 525/342; 525/326.1; 525/330.3; 525/331.9; 585/481; 585/503
(58) Field of Classification Search ............. 525/326.1, 525/330.3, 331.9, 342; 585/481, 503
See application file for complete search history.

(56) References Cited

U.S. PATENT DOCUMENTS 6,476,284 B1   11/2002   Ohashi et al.
7,030,194 B1 *  4/2006   Nakagawa et al. ........ 525/330.6
7,141,646 B2 * 11/2006   Kitano et al. ............... 528/482

FOREIGN PATENT DOCUMENTS

| CA | 2 365 605 A1 | 10/2000 |
|---|---|---|
| EP | 0 789 036 A2 | 8/1997 |
| EP | 0 845 479 A2 | 6/1998 |
| EP | 1081165 | 3/2001 |
| JP | 09-272715 A | 10/1997 |
| JP | 11-005815 A | 1/1999 |
| JP | 11-080250 A | 3/1999 |
| JP | 2000-38404 A | 2/2000 |
| JP | 2000-44626 A | 2/2000 |
| JP | 2000-128924 A | 5/2000 |
| JP | 2000-239319 | 9/2000 |
| JP | 2000-344831 A | 12/2000 |
| JP | 2001-106724 | 4/2001 |
| JP | 2001-131096 | 5/2001 |
| WO | WO 99/54365 | 10/1999 |
| WO | WO 99/54365 A1 | 10/1999 |
| WO | WO 00/59960 | * 10/2000 |
| WO | WO 01/85804 | * 11/2001 |

OTHER PUBLICATIONS

Supplementary European search report 03701128, dated Nov. 16, 2006.

* cited by examiner

*Primary Examiner*—Roberto Rábago
(74) *Attorney, Agent, or Firm*—Connolly Bove Lodge & Hutz LLP

(57) ABSTRACT

The present invention provides: a process for preparing a vinyl polymer containing a halogen in an amount of 1,000 mg or less per kilogram, in which a vinyl polymer containing the halogen produced by atom transfer radical polymerization of a vinyl monomer is heated at a temperature in the range of 140 to 250° C. to dehalogenate the vinyl polymer; a vinyl polymer obtained by the process; and a hydrosilylation-reactive curable composition containing the vinyl polymer.

9 Claims, No Drawings

PROCESS FOR PRODUCING VINYL POLYMER, VINYL POLYMER, AND CURABLE COMPOSITION

The present application is a divisional application of U.S. Non-Provisional application Ser. No. 10/501,023, filed on Jul. 9, 2004, now U.S. Pat. No. 7,323,519, which is a U.S. national phase application of PCT/JP03/00450 filed on Jan. 21, 2003, which claims priority to JP2002-11265, filed on Jan. 21, 2002, and JP 2002-21009, filed on Jan. 30, 2002, the contents of which are incorporated herein by reference in their entirety.

TECHNICAL FIELD

The present invention relates to a process for preparing a vinyl polymer, a vinyl polymer, and a curable composition.

BACKGROUND ART

Living polymerization, which is a type of precision polymerization, helps control molecular weight, molecular weight distribution, and the like, and is accordingly applied to processes for preparing various types of functional materials, such as terminal-functional polymers, block polymers, and graft polymers. In particular, one of the living polymerization, atom transfer radical polymerization, serves many uses because it can be performed under moderate conditions with use of a wide range of vinyl monomers. One example of atom transfer radical polymerization is a polymerization system in which an organic halide or a halogenated sulfonyl compound is used as an initiator and a metal complex containing a Group 8, 9, 10, or 11 element of the periodic table as the central atom is used as a catalyst (see, for example, Matyjaszewski et al., J. Am. Chem. Soc. 1995, 117, 5614, Macromolecules 1995, 28, 7901, Science 1996, 272, 866; Sawamoto et al., Macromolecules 1995, 28, 1721). Vinyl polymers prepared by these polymerization processes have a halogen at the terminus of the polymers.

Although vinyl polymers containing a halogen are used as intermediates for various processes for preparing functional materials, the halogen remaining in the polymer can cause a problem. For example, (1) a free acid derived from the halogen may negatively affect product quality and production equipment; or (2) a radical generated by thermal dissociation of the carbon-halogen bond may cause the molecular weight and molecular weight distribution to increase. In vinyl polymers prepared by atom transfer radical polymerization, it is therefore necessary to remove the halogen from the vinyl polymer in some way.

On the other hand, vinyl polymers having a plurality of reactive functional groups in their molecule are cured by crosslinking with use of an appropriate cross-linker. In particular, vinyl polymers selectively having a reactive functional group at their termini result in cured materials having a high molecular eight between crosslinking points and superior rubber elasticity, and are accordingly used as various types of material. A reactive functional group can be introduced to a terminus of a vinyl polymer having a halogen at the terminus prepared by atom transfer radical polymerization, by use of the reactivity of the terminal halogen (Japanese Unexamined Patent Application Publication Nos. 11-080250, 11-005815, 09-272715, 2000-38404, 2000-44626, and 2000-128924).

Methods of introducing a functional group by replacing the halogen with use of an agent having a reactive functional group (Japanese Unexamined Patent Application Publication Nos. 11-080250, 11-005815, 09-272715, 2000-38404, and 2000-128924) can simultaneously carry out the introduction of the functional group and the removal of the halogen. However, these methods limit the type of agent for the removal and require an additional step for removing the agent.

Another method of allowing an organic compound having an ethylenically unsaturated group together with a reactive functional group to react with the terminal halogenated (Japanese Unexamined Patent Application Publication No. 2000-44626) can easily introduce a functional group advantageously, but the halogen remains in the resulting polymer. The inventers of the present invention developed a process for removing the halogen by use of an oxyanion compound (Japanese Unexamined Patent Application Publication No. 2000-344831). This invention helps remove the halogen at a terminus of a vinyl polymer. It has however been found that a vinyl polymer with a silyl group produced by the process of the present invention does not have long-term stability in storage, and that it requires to be purified using a large amount of adsorbent after removal of the halogen in order to improve the long-term stability.

For removing the halogen of a vinyl polymer produced by atom transfer radical polymerization, a process performing an addition/elimination reaction in the polymer with use of a specific removing agent has been disclosed (WO99/54365). Unfortunately, this process limits the type of removing agent, and accordingly it is not easy to introduce a functional group. In addition, elimination produces a free acid.

SUMMARY OF THE INVENTION

Accordingly, the present invention is intended to overcome the above-described disadvantages, and to provide a process for preparing a vinyl polymer containing a reduced amount of halogen by dehalogenating a halogen-containing vinyl polymer produced by atom transfer radical polymerization, and a vinyl polymer produced by the process.

The present invention relates to a process for preparing a vinyl polymer containing a halogen in an amount of 1,000 mg or less per kilogram. The process comprises the dehalogenation step of heating a vinyl polymer containing the halogen at a temperature in the range of 140 to 250° C. to dehalogenate the vinyl polymer, the vinyl polymer being produced by atom transfer radical polymerization of a vinyl monomer.

The present invention also relates to a vinyl polymer produced by the process.

The present invention also relates to a hydrosilylation-reactive composition containing the vinyl polymer.

The present invention also relates to a vinyl polymer having a silyl group in its molecule, produced by allowing a vinyl polymer having an ethylenically unsaturated group prepared by the foregoing process to react with a compound having a hydrosilyl group.

The present invention also relates to a curable composition containing the vinyl polymer having a silyl group in its molecule.

The present invention further relates to a method for determining the number of groups expressed by general formula (C) per one molecule of a vinyl polymer produced by atom transfer radical polymerization. The method comprises the steps of: replacing the halogen of the group expressed by general formula (C) of the vinyl polymer, using a carboxylate containing a group capable of being detected by an analyzer; and determining the detectable group with the analyzer. General formula (C) is:

(C), (where X represents chlorine, bromine, or iodine; $R^{50}$ represents a hydrogen atom or an organic group having a carbon number in the range of 1 to 10; and $R^{51}$ represents a hydrogen atom, an organic group having a carbon number in the range of 1 to 20, or an alkali metal atom).

The present invention further relates to a method for determining the amount of the group expressed by general formula (C) per a unit weight of a vinyl polymer produced by atom transfer radical polymerization. The method comprises the steps of: replacing the halogen of the group expressed by general formula (C) of the vinyl polymer, using a carboxylate containing a group capable of being detected by an analyzer; and determining the detectable group with the analyzer.

The present invention will now be described in detail.

DETAILED DISCLOSURE OF INVENTION

The present invention provides a process for preparing a vinyl polymer containing a reduced amount of halogen through dehalogenation of a vinyl polymer containing a halogen produced by atom transfer radical polymerization (hereinafter may be referred to as halogen-containing vinyl polymer).

First, atom transfer radical polymerization will be described in detail.

The atom transfer radical polymerization in the present invention is a process of living radical polymerization. In this process, a vinyl monomer is subjected to radical polymerization using an organic halide or a halogenated sulfonyl compound as an initiator and a metal complex as a catalyst, the metal complex which contains a transition metal as the central metal. Since atom transfer radical polymerization allows the control of the molecular weight and molecular weight distribution and allows the introduction of a halogen to a terminus of a polymer, this polymerization is most suitable for preparing a halogen-containing vinyl polymer. Atom transfer radical polymerization will be described specifically.

Atom transfer radical polymerization has been published by, for example, Matyjaszewski et al., J. Am. Chem. Soc. 1995, Vol. 117, p. 5614, Macromolecules 1995, Vol. 28, p. 7901, Science 1996, Vol. 272, p. 866, WO 96/30421, WO 97/18247, WO 98/01480, and WO 98/40415; and Sawamoto et al., Macromolecules 1995, Vol. 28, p. 1721, and Japanese Unexamined Patent Application Publication Nos. 9-208616 and 8-41117.

The atom transfer radical polymerization uses as an initiator an organic halide, particularly an organic halide having a highly reactive carbon-halogen bond (for example, a carbonyl compound having a halogen at the α-position or a compound having a halogen at the benzyl position) or a halogenated sulfonyl compound. Specifically, such organic halides include:

$C_6H_5-CH_2X$, $C_6H_5-C(H)(X)CH_3$, and $C_6H_5-C(X)(CH_3)_2$ (where $C_6H_5$ represents a phenyl group, and X represents chlorine, bromine, or iodine);

$R^3-C(H)(X)-CO_2R^4$, $R^3-C(CH_3)(X)-CO_2R^4$, $R^3-C(H)(X)-C(O)R^4$, and $R^3-C(CH_3)(X)-C(O)R^4$ (where $R^3$ and $R^4$ each represent a hydrogen atom or an alkyl, aryl, or aralkyl group having a carbon number in the range of 1 to 20, and X represents chlorine, bromine, or iodine); and $R^3-C_6H_4-SO_2X$ (where $R^3$ represents a hydrogen atom or an alkyl, aryl, or aralkyl group having a carbon number in the range of 1 to 20, and X represents chlorine, bromine, or iodine).

By performing atom transfer radical polymerization of a vinyl monomer using an organic halide or a halogenated sulfonyl compound as an initiator, a vinyl polymer having a group expressed by general formula (A) at its terminus is produced.

$$-C(R^1)(R^2)(X) \tag{A}$$

(where $R^1$ and $R^2$ each represent a group bonded to an ethylenically unsaturated group of a vinyl monomer, and X represents chlorine, bromine, or iodine.)

An organic halide or halogenated sulfonyl compound having a functional group initiating the polymerization and a specific reactive functional group not initiating the polymerization may also be use as the initiator of the atom transfer radical polymerization. In this instance, a vinyl polymer is produced which has the specific reactive functional group at a terminus of the principal chain and has a group expressed by general formula (A) at the other terminus. Such specific reactive functional groups include alkenyl, crosslinkable silyl, hydroxyl, epoxy, amino, and amido. By use of these reactive functional groups, an appropriate functional group can be introduced to a vinyl polymer through a reaction in one or several steps.

The organic halide having an alkenyl group is not particularly limited, but may be expressed by, for example, general formula (2):

$$R^6R^7C(X)-R^8-R^9-C(R^5)=CH_2 \tag{2}$$

(wherein $R^5$ represents hydrogen or the methyl group; $R^6$ and $R^7$ represent hydrogen or monovalent alkyl, aryl, or aralkyl groups having a carbon number in the range of 1 to 20, or groups joined to each other at the other termini; $R^8$ represents $-C(O)O-$ (ester group), $-C(O)-$ (keto group), or an o-, m-, or p-phenylene group; $R^9$ represents a direct bond or a divalent organic group having a carbon number in the range of 1 to 20 which may includes at least one ether bond; and X represents chlorine, bromine, or iodine).

Exemplary substituents $R^6$ and $R^7$ include hydrogen and methyl, ethyl, n-propyl, isopropyl, butyl, pentyl, and hexyl groups. $R^6$ and $R^7$ may be joined to each other at the other termini to form a cyclic skeleton.

Exemplary organic halides having an alkenyl group, expressed by general formula (2) include:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

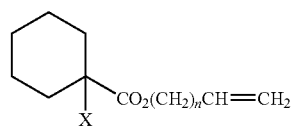

(in the formulas above, X represents chlorine, bromine, or iodine; and n represents an integer in the range of 0 to 20)

$$XCH_2C(O)O(CH_2)_nO(CH_2)_mCH=CH_2,$$

$$H_3CC(H)(X)C(O)O(CH_2)_nO(CH_2)_mCH=CH_2,$$

$$(H_3C)_2C(X)C(O)O(CH_2)_nO(CH_2)_mCH=CH_2,$$

$$CH_3CH_2C(H)(X)C(O)O(CH_2)_nO(CH_2)_mCH=CH_2,$$

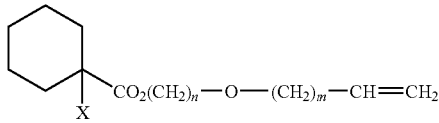

(in the formulas above, X represents chlorine, bromine, or iodine; n represents an integer in the range of 1 to 20; and m represents an integer in the range of 0 to 20)

o-, m-, or p-$XCH_2$—$C_6H_4$—$(CH_2)_n$—$CH=CH_2$, o-, m-, or p-$CH_3C(H)(X)$—$C_6H_4$—$(CH_2)_n$—$CH=CH_2$, o-, m-, or p-$CH_3CH_2C(H)(X)$—$C_6H_4$—$(CH_2)_n$—$CH=CH_2$, (in the formulas above, X represents chlorine, bromine, or iodine; and n represents an integer in the range of 0 to 20)

o-, m-, or p-$XCH_2$—$C_6H_4$—$(CH_2)_n$—O—$(CH_2)_m$—$CH=CH_2$, o-, m-, or p-$CH_3C(H)(X)$—$C_6H_4$—$(CH_2)_n$—O—$(CH_2)_m$—$CH=CH_2$, o-, m-, or p-$CH_3CH_2C(H)(X)$—$C_6H_4$—$(CH_2)_n$—O—$(CH_2)_m CH=CH_2$, (in the formula above, X represents chlorine, bromine, or iodine; n represents an integer in the range of 1 to 20; and m represents an integer in the range of 0 to 20)

o-, m-, or p-$XCH_2$—$C_6H_4$—O—$(CH_2)_n$—$CH=CH_2$, o-, m-, or p-$CH_3C(H)(X)$—$C_6H_4$—O—$(CH_2)_n$—$CH=CH_2$, o-, m-, or p-$CH_3CH_2C(H)(X)$—$C_6H_4$—O—$(CH_2)_n$—$CH=CH_2$, (in the formulas above, X represents chlorine, bromine, or iodine; and n represents an integer in the range of 0 to 20)

o-, m-, or p-$XCH_2$—$C_6H_4$—O—$(CH_2)_n$—O—$(CH_2)_m$—$CH=CH_2$, o-, m-, or p-$CH_3C(H)(X)$—$C_6H_4$—O—$(CH_2)_n$—O—$(CH_2)_m$—$CH=CH_2$, and o-, m-, or p-$CH_3CH_2C(H)(X)$—$C_6H_4$—O—$(CH_2)_n$—O—$(CH_2)_m$—$CH=CH_2$, (in the formulas above, X represents chlorine, bromine, or iodine; n represents an integer in the range of 1 to 20; and m represents an integer in the range of 0 to 20).

The organic halides having an alkenyl group also include compounds expressed by general formula (3):

$$H_2C=C(R^5)-R^9-C(R^6)(X)-R^{10}-R^7 \qquad (3)$$

(wherein $R^5$, $R^6$, $R^7$, $R^9$, and X are the same as above; and $R^{10}$ represents a direct bond, —C(O)O— (ester group), —C(O)— (keto group), or an o-, m-, or p-phenylene group).

$R^8$ represents a direct bond or a divalent organic group (may include one or more ester bonds). If $R^8$ is a direct bond, the carbon having a halogen bonds to a vinyl group to form a halogenated allyl compound. In this instance, the carbon-halogen bond is activated by the adjacent vinyl group, and accordingly $R^{10}$ does not necessarily have the C(O)O group or the phenylene group and may be a direct bond. If $R^9$ is not a direct bond, preferably $R^{10}$ is the C(O)O group, C(O) group, or the phenylene group in order to activate the carbon-halogen bond.

Exemplary compounds expressed by general formula (3) include:

$CH_2=CHCH_2X$, $CH_2=C(CH_3)CH_2X$, $CH_2=CHC(H)(X)CH_3$, $CH_2=C(CH_3)C(H)(X)CH_3$, $CH_2=CHC(X)(CH_3)_2$, $CH_2=CHC(H)(X)C_2H_5$, $CH_2=CHC(H)(X)CH(CH_3)_2$, $CH_2=CHC(H)(X)C_6H_5$, $CH_2=CHC(H)(X)CH_2C_6H_5$, $CH_2=CHCH_2C(H)(X)-CO_2R$, $CH_2=CH(CH_2)_2C(H)(X)-CO_2R$, $CH_2=CH(CH_2)_3C(H)(X)-CO_2R$, $CH_2=CH(CH_2)_8C(H)(X)-CO_2R$, $CH_2=CHCH_2C(H)(X)C_6H_5$, $CH_2=CH(CH_2)_2C(H)(X)-C_6H_5$, and $CH_2=CH(CH_2)_3C(H)(X)-C_6H_5$, (wherein X represents chlorine, bromine, or iodine, and R represents an alkyl, aryl, or aralkyl group having a carbon number in the range of 1 to 20).

Exemplary halogenated sulfonyl groups having an alkenyl group include:

o-, m-, or p-$CH_2=CH-(CH_2)_n-C_6H_4-SO_2X$, and o-, m-, or p-$CH_2=CH-(CH_2)_n-O-C_6H_4-SO_2X$, (wherein X represents chlorine, bromine, or iodine, and n represents an integer in the range of 0 to 20).

The above-mentioned organic halide having a crosslinkable silyl group is not particularly limited, but may have a structure expressed by, for example, general formula (4):

$$R^6R^7C(X)-R^8-R^9-C(H)(R^5)CH_2-[Si(R^{11})_{2-b}(Y)_b O]_m-Si(R^{12})_{3-a}(Y)_a \qquad (4)$$

(wherein $R^5$, $R^6$, $R^7$, $R^8$, $R^9$, and X are the same as above; $R^{11}$ and $R^{12}$ are each represent an alkyl, aryl, or aralkyl group having a carbon number in the range of 1 to 20, or a triorganosiloxy group expressed by $(R')_3SiO$— (R' represents a monovalent hydrocarbon group having a carbon number in the range of 1 to 20, and the three R' may be the same or different), and if the number of $R^{11}$ or $R^{12}$ is two or more, such $R^{11}$ or $R^{12}$ may be the same or different; Y represents the hydroxy group or a hydrolyzable group, and if the number of Y is two or more, Y may be the same or different; a represents 0, 1, 2, or 3; b represents 0, 1, or 2; m represents an integer in the range of 0 to 19; and the relationship a+mb≧1 holds).

Exemplary compounds expressed by general formula (4) include:

XCH$_2$C(O)O(CH$_2$)$_n$Si(OCH$_3$)$_3$,

CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$,

XCH$_2$C(O)O(CH$_2$)$_n$Si(CH$_3$)(OCH$_3$)$_2$,

CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$, (in the formulas above, X represents chlorine, bromine, or iodine; and n represents an integer in the range of 0 to 20)

XCH$_2$C(O)O(CH$_2$)$_n$O(CH$_2$)$_m$Si(OCH$_3$)$_3$,

H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$,

CH$_3$CH$_2$C(H)(X)C(O)O(CH$_2$)$_n$O(CH$_2$)$_m$Si(OCH$_3$)$_3$,

XCH$_2$C(O)O(CH$_2$)$_n$O(CH$_2$)$_m$Si(CH$_3$)(OCH$_3$)$_2$,

H$_3$CC(H)(X)C(O)O(CH$_2$)$_n$O(CH$_2$)$_m$—Si(CH$_3$)(OCH$_3$)$_2$, (H$_3$C)$_2$C(X)C(O)O(CH$_2$)$_n$O(CH$_2$)$_m$—Si(CH$_3$)(OCH$_3$)$_2$,

CH$_3$CH$_2$C(H)(X)C(O)O(CH$_2$)$_n$O(CH$_2$)$_m$—Si(CH$_3$)(OCH$_3$)$_2$, (in the formulas above, X represents chlorine, bromine, or iodine; n represents an integer in the range of 1 to 20; and m represents an integer in the range of 0 to 20)

o-, m-, or p-XCH$_2$—C$_6$H$_4$(CH$_2$)$_2$Si(OCH$_3$)$_3$, o-, m-, or p-CH$_3$C(H)(X)—C$_6$H$_4$—(CH$_2$)$_2$Si(OCH$_3$)$_3$, o-, m-, or p-CH$_3$CH$_2$C(H)(X)—C$_6$H$_4$—(CH$_2$)$_2$Si(OCH$_3$)$_3$, o-, m-, or p-XCH$_2$—C$_6$H$_4$—(CH$_2$)$_3$Si(OCH$_3$)$_3$, o-, m-, or p-CH$_3$C(H)(X)—C$_6$H$_4$—(CH$_2$)$_3$Si(OCH$_3$)$_3$, o-, m-, or p-CH$_3$CH$_2$C(H)(X)—C$_6$H$_4$—(CH$_2$)$_3$Si(OCH$_3$)$_3$, o-, m-, or p-XCH$_2$—C$_6$H$_4$—(CH$_2$)$_2$—O—(CH$_2$)$_3$Si(OCH$_3$)$_3$, o-, m-, or p-CH$_3$C(H)(X)—C$_6$H$_4$—(CH$_2$)$_2$—O—(CH$_2$)$_3$Si(OCH$_3$)$_3$, o-, m-, or p-CH$_3$CH$_2$C(H)(X)—C$_6$H$_4$—(CH$_2$)$_2$—O—(CH$_2$)$_3$Si(OCH$_3$)$_3$, o-, m-, or p-XCH$_2$—C$_6$H$_4$—O—(CH$_2$)$_3$Si(OCH$_3$)$_3$, o-, m-, or p-CH$_3$C(H)(X)—C$_6$H$_4$—O—(CH$_2$)$_3$Si(OCH$_3$)$_3$, o-, m-, or p-CH$_3$CH$_2$C(H)(X)—C$_6$H$_4$—O—(CH$_2$)$_3$—Si(OCH$_3$)$_3$, o-, m-, or p-XCH$_2$—C$_6$H$_4$—O—(CH$_2$)$_2$—O—(CH$_2$)$_3$—Si(OCH$_3$)$_3$, o-, m-, or p-CH$_3$C(H)(X)—C$_6$H$_4$—O—(CH$_2$)$_2$—O—(CH$_2$)$_3$Si(OCH$_3$)$_3$, and o-, m-, or p-CH$_3$CH$_2$C(H)(X)—C$_6$H$_4$—O—(CH$_2$)$_2$—O—(CH$_2$)$_3$Si(OCH$_3$)$_3$, (in the formulas above, X represents chlorine, bromine, or iodine).

The organic halides having a crosslinkable silyl group also include compounds having a structure expressed by general formula (5):

$$(R^{12})_{3-a}(y)_a Si—[OSi(R^{11})_{2-b}(Y)_b]_m—CH_2—(H)(R^5)—R^9—C(R^6)(X)—R^{10}—R^7 \quad (5)$$

(wherein $R^5$, $R^7$, $R^8$, $R^9$, $R^{10}$, $R^{11}$, $R^{12}$, a, b, m, X, and Y are the same as above).

Examples of such compounds include:

(CH$_3$O)$_3$SiCH$_2$CH$_2$C(H)(x)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—CO$_2$R, (CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R, (CH$_3$O)$_2$(CH$_3$)Si(CH$_2$)$_4$C(H)(X)—CO$_2$R, (CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$, (CH$_3$O)$_3$Si(CH$_2$)$_4$C(H)(X)—C$_6$H$_5$, and (CH$_3$O)$_2$(CH$_3$)Si(CH$_2$)$_4$C(H)(X)—C$_6$H$_5$, (wherein X represents chlorine, bromine, or iodine, and R represents an alkyl, aryl, or aralkyl group having a carbon number in the range of 1 to 20).

The above-mentioned organic halide or halogenated sulfonyl compound having a hydroxyl group is not particularly limited, but may be expressed by, for example:

HO—(CH$_2$)$_n$—OC(O)C(H)(R)(X)

(wherein X represents chlorine, bromine, or iodine, and R represents a hydrogen atom or an alkyl, aryl, or aralkyl group having a carbon number in the range of 1 to 20).

The above-mentioned organic halide having an amino group is not particularly limited, but may be expressed by, for example:

H$_2$N—(CH$_2$)$_n$—OC(O)C(H)(R)(X)

(wherein X represents chlorine, bromine, or iodine, and R represents a hydrogen atom or an alkyl, aryl, or aralkyl group having a carbon number in the range of 1 to 20).

The above-mentioned organic halide having an epoxy group is not particularly limited, but may be expressed by, for example:

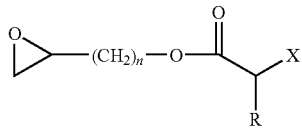

(wherein X represents chlorine, bromine, or iodine, and R represents a hydrogen atom or an alkyl, aryl, or aralkyl group having a carbon number in the range of 1 to 20).

In order to prepare a polymer having at least two halogens in one molecule, it is preferable to use an organic halide or halogenated sulfonyl compound having at least two starting points as the initiator. Examples of such compounds include:

o,m,p-  X—CH$_2$—C$_6$H$_4$—CH$_2$—X

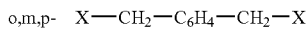
o,m,p-  X—CH—C$_6$H$_4$—CH—X (with CH$_3$ groups)

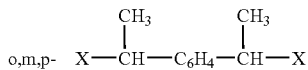
o,m,p-  X—C(CH$_3$)$_2$—C$_6$H$_4$—C(CH$_3$)$_2$—X (wherein C$_6$H$_4$ represents the phenylene group, and X represents chlorine, bromine, or iodine)

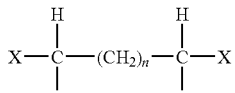
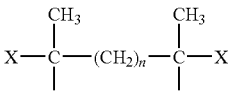
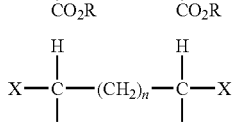
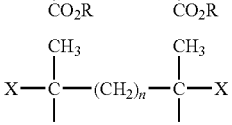

(wherein R represents an alkyl, aryl, or aralkyl group having a carbon number in the range of 1 to 20, n represents an integer in the range of 0 to 20, and X represents chlorine, bromine, or iodine)

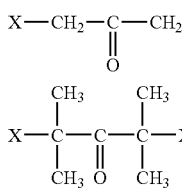
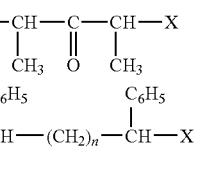

(wherein X represents chlorine, bromine, or iodine, and n represents an integer in the range of 0 to 20)

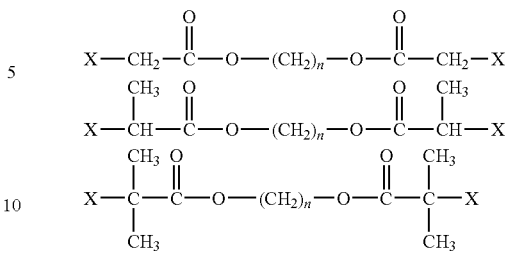

(wherein n represents an integer in the range of 1 to 20, and X represents chlorine, bromine, or iodine)

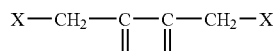
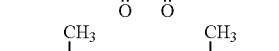
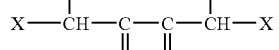

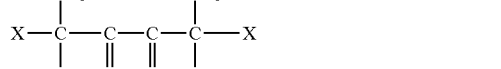
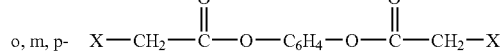
o, m, p-  X—SO$_2$—C$_6$H$_4$—SO$_2$—X (wherein X represents chlorine, bromine, or iodine).

The transition metal complex used as the polymerization catalyst is not particularly limited, but is preferably a metal complex having a central metal selected from the elements of Groups 7, 8, 9, 10, and 11 in the periodic table. More preferably, non-valent and monovalent copper complexes, and divalent ruthenium, iron, and nickel complexes are used. Among these preferred are copper complexes. Exemplary monovalent copper compounds include copper (I) chloride, copper (I) bromide, copper (I) iodide, copper (I) cyanide, copper (I) oxide, and copper (I) perchlorate. In use of a monovalent copper compound, 2,2'-bipyridyl or its derivative, 1,10-phenanthroline or its derivative, or a polyamine such as tetramethylethylenediamine, pentamethyldiethylenetriamine, or hexamethyltris(2-aminoethyl)amine may be added as the ligand to enhance catalytic activity. A tristriphenylphosphine complex of divalent ruthenium chloride (RuCl$_2$(PPh$_3$)$_3$) is also preferably used as the catalyst. In use of a ruthenium compound as the catalyst, an aluminium alkoxide is added as an activator. In addition, a bistriphenylphosphine complex of divalent iron (FeCl$_2$(PPh$_3$)$_2$), a bistriphenylphosphine complex of divalent nickel (NiCl$_2$(PPh$_3$)$_2$), and a bistributylphosphine complex of divalent nickel (NiBr$_2$(PBu$_3$)$_2$) are also preferably used as the catalyst.

The vinyl monomers used for the atom transfer radical polymerization include, but not particularly limited to, (meth)

acrylic monomers, such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, ethylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; styrene monomers, such as styrene, vinyl toluene, α-methylstyrene, chlorostyrene, and styrenesulfonic acid and its salts; fluorine-containing vinyl monomers, such as perfluoroethylene, perfluoropropylene, and vinylidene fluoride; silicon-containing vinyl monomers, such as vinyltrimethoxysilane and vinyltriethoxysilane; maleic anhydride, maleic acid, and monoalkyl esters and dialkyl esters of maleic acid; fumaric acid and monoalkyl esters and dialkyl esters of fumaric acid; maleimide-based monomers, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers, such as acrylonitrile and methacrylonitrile; amido group-containing vinyl monomers, such as acrylamide and methacrylamide; vinyl esters, such as vinyl acetate, vinyl propionate, vinyl pivalate, vinyl benzoate, and vinyl cinnamate; alkenes, such as ethylene and propylene; conjugated dienes, such as butadiene and isoprene; and vinyl chloride, vinylidene chloride, allyl chloride, and allyl alcohols. These monomers may be used singly, or in combination to be copolymerized. Among these, preferred are styrene monomers and (meth)acrylic monomers, from the viewpoint of the physical properties of the resulting product. More preferred monomers are acrylic ester monomers and methacrylic ester monomers, particularly preferred monomers are acrylic ester monomers, and still more preferred monomer is butyl acrylate. In the present invention, these preferred monomers may be copolymerized with other monomers, and may further be block-copolymerized. In such cases, preferably, 40% of these preferred monomers is contained on a weight basis. The above-mentioned (meth)acrylic acid refers to acrylic acid and/or methacrylic acid.

The atom transfer radical polymerization can be performed without solvent, or in various types of solvent. The type of the solvent is not particularly limited, but exemplary solvents include: hydrocarbon solvents, such as benzene and toluene; ether solvents, such as diethyl ether, tetrahydrofuran, diphenyl ether, anisole, and dimethoxybenzene; halogenated hydrocarbon solvents, such as methylene chloride, chloroform, and chlorobenzene; ketone solvents, such as acetone, methyl ethyl ketone, and methyl isobutyl ketone; alcohol solvents, such as methanol, ethanol, propanol, isopropanol, n-butyl alcohol, and tert-butyl alcohol; nitrile solvents, such as acetonitrile, propionitrile, and benzonitrile; ester solvents, such as ethyl acetate and butyl acetate; carbonate solvents, such as ethylene carbonate and propylene carbonate; amide solvents, such as N,N-dimethylformamide, and N,N-dimethylacetamide. These solvents may be used singly or in combination. The polymerization can be performed in a system using emulsion or supercritical fluid $CO_2$ as a medium.

The polymerization can be performed in, but not limited to, temperatures in the range of 0 to 200° C., preferably between room temperature and 150° C., and more preferably in the range of 50 to 120° C.

The "vinyl polymer containing a halogen produced by atom transfer radical polymerization" of the present invention is not limited to halogen-containing vinyl polymers "directly produced" by atom transfer radical polymerization of a vinyl monomer. Halogen-containing vinyl polymers produced "indirectly" from a vinyl polymer produced by atom transfer radical polymerization may also be subject to dehalogenation of the present invention.

"Directly produced" here means producing a halogen-containing vinyl polymer with use of a reaction system of atom transfer radical polymerization. For example, a halogen may be introduced to a terminus being a polymerization initiation site of a vinyl polymer with use of an initiator containing the halogen, having no polymerization activity (Case 1); or to a side chain of a polymer by polymerizing a vinyl monomer containing the halogen (Case 2); and the terminus structure of the halogen shown in the group expressed by general formula (A) may be produced by atom transfer radical polymerization of a vinyl monomer (Case 3). The vinyl monomer used in Case 3 is not particularly limited, and a specific vinyl monomer intended for use in transformation into a preferred halogen-containing structure may be used, as well as vinyl monomers constituting vinyl polymers.

On the other hand, "indirectly" producing means producing a halogen-containing polymer from a vinyl polymer produced by atom transfer radical polymerization of a vinyl monomer. Specifically, such a vinyl polymer containing a halogen is produced by allowing a specific compound to react with a vinyl polymer produced by atom transfer radical polymerization in a chemical reaction system other than reaction systems of atom transfer radical polymerization. The halogen-containing vinyl polymer may be produced through a plurality of chemical reactions after atom transfer radical polymerization. The "specific compound" is selected according to purposes, and is not particularly limited. For example, the specific compound may be a compound used for transformation into a preferred halogen-containing structure, or a compound used for introduction of a functional group. The vinyl monomers enumerated in the description of atom transfer radical polymerization may also be suitably used. In addition, compounds containing an ethylenically unsaturated group, described later, may also be used. The halogen in the vinyl polymer is not particularly limited, and may be a halogen in a vinyl polymer directly produced by atom transfer radical polymerization, or a halogen newly introduced to the vinyl polymer by a reaction with a halogen-originated or a specific compound.

The molecular weight of the halogen-containing vinyl polymer is not particularly limited, but is preferably in the range of 1,000 to 100,000. More preferably, the lower limit is 5,000 or more. More preferably, the upper limit is 50,000 or less. The molecular weight distribution (weight average molecular weight/number average molecular weight) of the halogen-containing vinyl polymer is not particularly limited, but is preferably in the range of 1.05 to 1.50. More preferably, the lower limit is 1.10 or more. More preferably, the upper limit is 1.40 or less. The molecular weight and the molecular weight distribution are calculated by standard polystyrene conversion using gel permeation chromatography (GPC)(the same applies to the following description).

Halogen-containing vinyl polymers having a functional group in its molecule can also be suitably dehalogenated. The functional group is not particularly limited, but exemplary functional groups include ethylenically unsaturated, hydroxy, silyl, amino, carboxylic acid, carboxylate, and epoxy groups. Among these, preferred are ethylenically unsaturated groups and the hydroxy group. The number of functional groups in one polymer molecule is not particularly limited, but the lower limit is preferably 0.5 or more, more preferably 0.8 or more, still more preferably 1.0 or more, still further preferably 1.2 or more, and particularly preferably 1.5 or more. The upper limit is preferably 5.0 or less, more preferably 4.0 or less, still more preferably 3.0 or less, and particularly preferably 2.5 or less. The position of the functional group is not particularly limited. If the functional group is used as a crosslinkable reactive group, it is positioned preferably close to the terminus of the chain, and more preferably in the terminus of the chain.

The introduction of the functional group is not particularly limited in process, and various processes may be applied. For example:

(1) a vinyl monomer having a functional group may be copolymerized with a predetermined vinyl monomer under conditions of atom transfer radical polymerization;
(2) a less radical-polymerizable olefin compound having a functional group may be allowed to react with the terminal halogen group of a vinyl polymer under conditions of atom transfer radical polymerization; or
(3) the terminal halogen group of a vinyl polymer is replaced with use of a specific compound having a functional group.

Preferable, process (2) is applied because vinyl polymers can be controlled in the molecular weight and molecular weight distribution and the number of functional groups, and thus a vinyl polymer according to the purpose can be designed.

Process (2) of functional group introduction will be described in detail below.

By adding a less polymerizable olefin compound having a functional group during atom transfer radical polymerization or at the end of the polymerization, the compound is added to substantially each terminus, and consequently the functional group having the olefin compound is introduced to the terminus of the polymer. The end of the polymerization means the point where at least 80%, preferably 90%, more preferably 95%, particularly preferably 99% of the monomer has reacted.

The less polymerizable olefin compound having a functional group is selected from the compounds expressed by general formula 6:

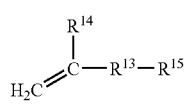

(6)

wherein $R^{15}$ represents a hydroxy, amino, epoxy, carboxylic acid, ester, ether, amido, or silyl group or a group expressed by general formula 7:

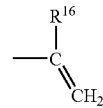

(7)

($R^{16}$ represents a hydrogen atom or the methyl group), and wherein $R^{13}$ represents a divalent hydrocarbon group having a carbon number in the range of 1 to 20 or a group expressed by general formula 8:

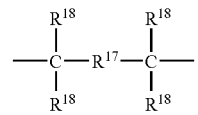

(8)

($R^{17}$ represents an oxygen or nitrogen atom or an organic group having a carbon number in the range of 1 to 20; and $R^{18}$ each represent a hydrogen atom or the methyl group, and they may be the same or different), and $R^{14}$ represents a hydrogen atom or the methyl group.

Exemplary groups designated by $R^{13}$ in general formula 6 include:

—$(CH_2)_n$— (n represents an integer of 1 to 20),

—$CH(CH_3)$—, —$CH(CH_2CH_3)$—, —$C(CH_3)_2$—, —$C(CH_3)(CH_2CH_3)$—,

—$C(CH_2CH_3)_2$—, —$CH_2CH(CH_3)$—,

—$(CH_2)_n$—O—$CH_2$— (n represents an integer of 1 to 19),

—$CH(CH_3)$—O—$CH_2$—, —$CH(CH_2CH_3)$—O—$CH_2$—, —$C(CH_3)_2$—O—$CH_2$—,

—$C(CH_3)(CH_2CH_3)$—O—$CH_2$—, —$C(CH_2CH_3)_2$—O—$CH_2$—,

—$(CH_2)_n$—O—$(CH_2)_m$— (m and n represent an integer of 1 to 19, and $2 \leq m+n \leq 20$ holds), —$(CH_2)_n$—C(O)O—$(CH_2)_m$— (m and n represent an integer of 1 to 19, and $2 \leq m+n \leq 20$ holds), —$(CH_2)_n$—OC(O)—$(CH_2)_m$—C(O)O—$(CH_2)_l$— (l represents an integer of 0 to 18; m and n represent an integer of 1 to 17; and $2 \leq l+m+n \leq 18$), —$(CH_2)_n$-o-, m-, p-$C_6H_4$—, —$(CH_2)_n$-o-, m-, p-$C_6H_4$—$(CH_2)_m$— (m represents an integer of 0 to 13, n represents an integer of 1 to 14, and $1 \leq m+n \leq 14$ holds), —$(CH_2)_n$-o-,m-,p-$C_6H_4$—O—$(CH_2)_m$— (m represents an integer of 0 to 13, n represents an integer of 1 to 14, and $1 \leq m+n \leq 14$ holds), —$(CH_2)_n$-o-, m-, p-$C_6H_4$—O—$CH(CH_3)$— (n represents an integer of 1 to 12), —$(CH_2)_n$-o-, m-, p-$C_6H_4$—O—$CH(CH_3)_2$— (n represents an integer of 1 to 11), —$(CH_2)_n$-o-, m-, p-$C_6H_4$—C(O)O—$(CH_2)_m$— (m and n represent an integer of 1 to 12, and 2≦m+n≦13 holds), —$(CH_2)_n$—OC(O)-o-, m-, p-$C_6H_4$—C(O)O—$(CH_2)_m$— (m and n represent an integer of 1 to 11, and 2≦m+n≦12 holds), —$(CH_2)_n$-o-, m-, p-$C_6H_4$—OC(O)—$(CH_2)_m$— (m and n represent an integer of 1 to 12, and 2≦m+n≦13 holds), and —$(CH_2)_n$—C(O)O-o-, m-, p-$C_6H_4$—$(CH_2)_m$ (m and n represent an integer of 1 to 11, and 2≦m+n≦12 holds).

$R^{14}$ in the general formula 6 represents a hydrogen atom or the methyl group, and is preferably a hydrogen atom. Exemplary groups designated by $R^{15}$ in general formula 6 include:

—OH  —O—$R^{19}$  —$NH_2$  —N(H)—$R^{19}$

—N($R^{19}$)—$R^{19}$  —C(=O)—O—$R^{19}$  —O—C(=O)—$R^{19}$

—C(=O)—N(H)—$R^{19}$  —C(=O)—N($R^{19}$)—$R^{19}$

—N(H)—C(=O)—$R^{19}$  —N($R^{20}$)—C(=O)—$R^{19}$ (epoxide)  $CH_2$=C($R^{16}$)—

—[Si$(R^{21})_{2-b}(Y)_bO]_m$—Si$(R^{22})_{3-a}(Y)_a$

[In the formulas, $R^{19}$ and $R^{20}$ each represent a hydrocarbon group having a carbon number in the range of 1 to 20, and they may be the same or different. $R^{21}$ and $R^{22}$ each represent an alkyl group having a carbon number in the range of 1 to 20, an aryl group having a carbon number in the range of 6 to 20, an aralkyl group having a carbon number in the range of 7 to 20, or a triorganosiloxy group expressed by (R')$_3$SiO— (where three R' represent a hydrocarbon group having a carbon number in the range of 1 to 20, and may be the same or different). If the number of $R^{21}$ or $R^{22}$ is two or more, those $R^{21}$ or $R^{22}$ may be the same or different. Y represents a hydroxy group or a hydrolyzable group, and if the number of Y is two or more, they may be the same or different. a represents 0, 1, 2, or 3; b represents 0, 1, or 2. m represents an integer in the range of 0 to 19. a and b satisfy the relationship a+mb≧1.]

Exemplary groups designated by $R^{19}$ include:

—$(CH_2)_n$—$CH_3$,

—CH($CH_3$)—$(CH_2)_n$—$CH_3$,

—CH($CH_2CH_3$)—$(CH_2)_n$—$CH_3$,

—CH($CH_2CH_3$)$_2$,

—C($CH_3$)$_2$—$(CH_2)_n$—$CH_3$,

—C($CH_3$)($CH_2CH_3$)—$(CH_2)_n$—$CH_3$,

—$C_6H_5$,

—$C_6H_5$($CH_3$),

—$C_6H_5$($CH_3$)$_2$,

—$(CH_2)_n$—$C_6H_5$,

—$(CH_2)_n$—$C_6H_5$($CH_3$), and

—$(CH_2)_n$—$C_6H_5$($CH_3$)$_2$, (wherein n represents an integer of 0 or more, and the total carbon number of each group is 20 or less).

For the hydrolyzable group designated by Y, any known groups may be used without particular limitation. For example, such groups include hydrogen and halogen atoms and alkoxy, acyloxy, ketoximate, amino, amido, acid amido, aminoxy, mercapto, and alkenyloxy groups. Among these, alkoxy is particularly preferable because of its mild hydrolyzability and easy handling. One to three of hydrolyzable groups or hydroxy groups can bond to one silicon atom, and preferably a+mb, that is, the total number of hydrolyzable groups, is in the range of 1 to 5. If at least two hydrolyzable groups or hydroxy groups bond to the silyl group, they may be the same or different. The number of silicon atoms of the silyl group may be 1 or more than 1, but if the silicon atoms are coupled by a siloxane bond, the number of silicon atoms may be up to about 20.

A compound having two less polymerizable alkenyl groups, used for introduction of an alkenyl group is selected from the compounds expressed by general formula 9:

$$H_2C{=}C(R^{14}){-}R^{13}{-}C(R^{16}){=}CH_2 \quad (9)$$

(wherein $R^{13}$ is the same as above; and $R^{14}$ and $R^{16}$ each represent a hydrogen atom or the methyl group, and they may be the same or different).

The compound of general formula 9 is not particularly limited, but if $R^{13}$ is a divalent hydrocarbon group having a carbon number in the range of 1 to 20, the compound is preferably expressed by:

$$H_2C{=}HC{-}(CH_2)_n{-}CH{=}CH_2$$

n represents an integer in the range of 1 to 20, and preferably 2, 4, or 6 from the viewpoint of availability of the raw materials. Specifically, 1,5-hexadiene, 1,7-octadiene, and 1,9-decadiene are preferable.

In addition to these less polymerizable olefin compounds having a functional group, alkenyl alcohols and alkenyl amines are preferable.

The silyl group of the less polymerizable olefin compound is not particularly limited, but preferably m=0 holds in the formula above.

If a less polymerizable olefin compound having an amino, hydroxy, or carboxylic acid group is allowed to react with the terminus of the polymer, the compound may be used as it is. However, if these groups negatively affect the terminus of the polymer or the catalyst, a compound having a protecting group may be used. Such protecting groups include acetyl, silyl, and alkoxy.

The amount of less polymerizable olefin compound used for introducing a functional group is not particularly limited. The alkenyl group of the compound is not reactive much. In order to increase the reaction rate, it is preferable to increase the amount of the compound added. In contrast, in order to reduce cost, it is preferable that the amount added be close to the amount of growing terminus. Thus, the amount of the compound is appropriately set according to the circumstances.

For introduction of an alkenyl group to the terminus, the amount of the compound having at least two less polymerizable alkenyl groups is preferably excessive to the amount of polymerization growing terminus. If the amount is less than or equal to the amount of growing terminus, both of the two alkenyl groups may react to couple the polymerization termini. In use of a compound containing two alkenyl groups having the same reactivity, the probability of occurrence of coupling statistically depends on the excess amount of the compound added. Accordingly, the amount of the compound is preferably at least 1.5 times, more preferably at least 3 times, and particularly preferably at least 5 times.

[Method of Dehalogenation]

The halogen-containing vinyl polymer produced by atom transfer radical polymerization is dehalogenated by the following method.

The halogen-containing vinyl polymer can be dehalogenated by heating. In order to reduce treatment time, higher temperature is preferable. However, an excessively high temperature causes the vinyl polymer to decompose or thermally deteriorate. Accordingly, it is preferable that the heat treatment be performed at a temperature in a range not causing the polymer to decompose or thermal deteriorate remarkably. Specifically, the heat treatment is performed at a temperature in the range of 140 to 250° C. Preferably, the temperature is in the range of 150 to 250° C., more preferably 170 to 250° C., and still more preferably 190 to 250° C.

The time of treatment can be set between several minutes and several tens of hours without particular limitation. However, since heat treatment at high temperature for a long time causes the vinyl polymer to break or thermally deteriorate, it is preferable to avoid excessive heating. (Meth)acrylic polymers have high heat resistance and high decomposition starting temperature, and accordingly allow high-temperature heat treatment.

Whether the presence or absence of solvent is not particularly limited, but preferably the heat treatment is performed without solvent.

In the present invention, preferably, the dehalogenation is performed by promoting a cyclization reaction in the molecule of the vinyl polymer, in order to prevent the decomposition of the polymer. Particularly preferably, the cyclization reaction forms a lactone ring in the vinyl polymer.

Preferably, the dehalogenation is performed by removing an organic halide from the halogen-containing vinyl polymer, in order to prevent generation of a free acid.

In the most preferred embodiment of the present invention, the dehalogenation is performed by forming a lactone ring through a cyclization reaction, and thus removing the organic halide.

A vinyl polymer having a group expressed by general formula (A) at its terminus, produced by atom transfer radical polymerization of a vinyl monomer can be dehalogenated by the above-described heat treatment, and general formula (A) is:

$$-C(R^1)(R^2)(X) \quad (A)$$

(wherein $R^1$ and $R^2$ each represent a group bonding to an ethylenically unsaturated group of a vinyl monomer, and X represents chlorine, bromine, or iodine).

$R^1$ and $R^2$, which are groups bonding to an ethylenically unsaturated group of a vinyl monomer, preferably bond to an ethylenically unsaturated group of a (meth)acrylic monomer.

If a free acid resulting from high temperature heat treatment, polymer deterioration such as molecular weight jump, or an affect to the functional group of the vinyl polymer may cause some problem, it is preferable to transform the group into a specific halogen-containing structure in advance. For example, a vinyl polymer having a group expressed by general formula (B) formed by transforming the group expressed by general formula (A) can rapidly promote the dehalogenation with coupling between polymers prevented.

$$-C(R^1)(R^2)-CH_2-CH(X)- \quad (B)$$

(In the formula, $R^1$ and $R^2$ each represent a group bonding to an ethylenically unsaturated group of a vinyl monomer, and X represents chlorine, bromine, or iodine.)

$R^1$ and $R^2$, which are groups bonding to an ethylenically unsaturated group of a vinyl monomer, preferably bond to an ethylenically unsaturated group of a (meth)acrylic monomer.

If the halogen-containing structure is of a γ-halocarboxylic acid, γ-halocarboxylate, or γ-haloester (hereinafter referred to as γ-halocarboxylic acid structure or the like), dehalogenation is easily promoted by heat treatment. Thus, these structures are preferred halogen-containing structure in the dehalogenation.

A vinyl polymer having a γ-halocarboxylic acid structure or the like is prepared by allowing a vinyl polymer having a halogen at its terminus produced by atom transfer radical polymerization to react with a compound having at least one ethylenically unsaturated group in the molecule.

The γ-halocarboxylic acid structure or the like is not particularly limited, but is preferably a group expressed by general formula (D):

$$-C(R^{50})(CO_2R^{51})-CH_2-CH(X)-CH(R^{52})-R^{53} \quad (D)$$

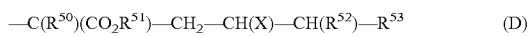

(wherein X represents chlorine, bromine, or iodine; $R^{50}$ represents a hydrogen atom or an organic group having a carbon number in the range of 1 to 10; $R^{51}$ represents a hydrogen atom, an organic group having a carbon number in the range of 1 to 20, or an alkali metal atom; $R^{52}$ represents a hydrogen atom, a hydroxy group, or an organic group; and $R^{53}$ represents a hydrogen atom, a hydroxy group, or an organic group).

$R^{50}$ is a hydrogen atom or an organic group having a carbon number in the range of 1 to 10, preferably a hydrogen atom or a hydrocarbon group having a carbon number in the range of 1 to 5, more preferably a hydrogen atom or the methyl group, and most preferably a hydrogen atom.

$R^{51}$ is a hydrogen atom, an organic group having a carbon number in the range of 1 to 20, or an alkali metal atom. The organic groups having a carbon number in the range of 1 to 20 include, for example, alkyl groups having a carbon number in the range of 1 to 20, aryl groups having a carbon number in the range of 6 to 20, and aralkyl groups having a carbon number in the range of 7 to 20. They may contain at least one ether bond, and such groups are, for example, alkoxyalkyl groups having a carbon number in the range of 2 to 20. Preferred groups designated by $R^{51}$ are a hydrogen atom, an alkali metal atom, alkyl groups having a carbon number in the range of 1 to 20, and alkoxyalkyl groups having a carbon number in the range of 2 to 20, more preferably a hydrogen atom, a sodium atom, a potassium atom, alkyl groups having a carbon number in the range of 1 to 20, and alkoxyalkyl groups having a carbon number in the range of 2 to 20, and particularly preferably alkyl groups having a carbon number in the range of 1 to 20 and alkoxyalkyl groups having a carbon number in the range of 2 to 20.

$R^{52}$ and $R^{53}$ are each a hydrogen atom, a hydroxy group, or a monovalent or divalent organic group, and they may be the same or different. If $R^{52}$ and $R^{53}$ are organic groups, they may contain at least one ether bond or at least one ester bond. $R^{52}$ and $R^{53}$ may be joined to each other at the other termini to form a cyclic skeleton. Alternatively, they may be divalent organic groups joining to polymers such as vinyl polymers. Alternatively, they may be divalent organic groups joining to a functional group such as an ethylenically unsaturated group or a hydroxy, amino, or silyl group. $R^{52}$ is preferably a hydrogen atom or a hydrocarbon group having a carbon number in the range of 1 to 20, and particularly preferably a hydrogen atom or the methyl group. If $R^{53}$ is a monovalent organic group, the organic group preferably has a carbon number in the range of 1 to 20, and is particularly preferably a hydrocarbon group having a carbon number in the range of 1 to 20. If $R^{53}$ is a functional group or a divalent organic group joining to the polymer, $R^{53}$ is preferably an organic group having a carbon number in the range of 1 to 20, and particularly preferably a hydrocarbon group having a carbon number in the range of 1 to 20. The functional group is preferably an ethylenically unsaturated group or a hydroxy group.

The vinyl polymer having a group expressed by general formula (D) is dehalogenated by removing the halogen X by heating and forming a lactone ring. If $R^{51}$ in general formula (D) is an organic group having a carbon number in the range of 1 to 20, the halogen X is removed in an organic halide form. Consequently, a free acid is prevented from occurring.

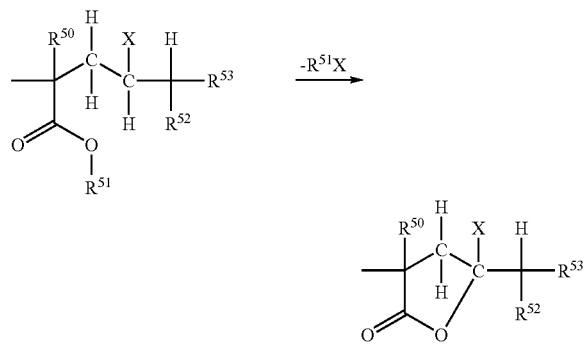

The production process of the vinyl polymer having a group expressed by general formula (A), (B), or (D) is not particularly limited, but the vinyl polymer can be directly or indirectly prepared by atom transfer radical polymerization. The following describes a production process concretely.

The vinyl polymer having a group expressed by general formula (A) can be prepared by, for example, the above-described atom transfer radical polymerization of a vinyl monomer. In particular, (meth)acrylic monomers result in a vinyl polymer having a group expressed by general formula (C) at its terminus. In this instance, $R^{50}$ and $CO_2R^{51}$, which are substituents of the group expressed by general formula (C), are derived from the group bonding to the ethylenically unsaturated group of the (meth)acrylic monomer.

$$—C(R^{50})(CO_2R^{51})—X \qquad (C)$$

(In the formula, X represents chlorine, bromine, or iodine; $R^{50}$ represents a hydrogen atom or an organic group having a carbon number in the range of 1 to 10; $R^{51}$ represents a hydrogen atom, an organic group having a carbon number in the range of 1 to 20, or an alkali metal atom.)

The vinyl polymer having a group expressed by general formula (B) is produced by preparing a vinyl polymer having a group expressed by general formula (A) and allowing the terminal halogen to react with a compound containing an ethylenically unsaturated group.

The vinyl polymer having a group expressed by general formula (D) is produced by allowing the terminal halogen of a vinyl polymer having a group expressed by general formula (A) prepared by atom transfer radical polymerization of a vinyl monomer to react with a compound containing an ethylenically unsaturated group, such as pentenoic acid or its derivative.

Alternatively, the vinyl polymer having a group expressed by general formula (D) may be prepared by the following process.

A vinyl polymer having a group expressed by general formula (C) at its terminus is prepared by atom transfer radical polymerization of a vinyl monomer. The terminal halogen of the vinyl polymer is allowed to react with a compound having at least one ethylenically unsaturated group in the molecule, expressed by general formula (E), and thus the terminus of the vinyl polymer is transformed into the group expressed by general formula (D).

$$CH_2\!=\!CH—CH(R^{52})—R^{53} \qquad (E)$$

(In the formula, $R^{52}$ and $R^{53}$ are the same.)

The process for preparing the vinyl polymer having a group expressed by general formula (C) is not particularly limited, but preferably, a process using atom transfer radical polymerization of a (meth)acrylic monomer is applied because the process is simple.

The compound containing an ethylenically unsaturated group, expressed by general formula (E) is not particularly limited, but preferably has a low radical polymerization activity. Such a compound is preferably a hydrocarbon, and exemplary compounds include aliphatic hydrocarbons containing an ethylenically unsaturated group, such as $CH_2\!=\!CH—(CH_2)_n—CH_3$ (n represents an integer in the range of 0 to 20), and aromatic hydrocarbons containing an ethylenically unsaturated group, such as $CH\!=\!CH—(CH_2)_n—C_6H_5$ (n represents an integer in the range of 1 to 20).

Compounds having a plurality of ethylenically unsaturated groups in the molecule may also be used advantageously. In use of a compound having a plurality of ethylenically unsaturated groups in the molecule, controlling the molar ratio of the ethylenically unsaturated groups to the chain termini allows coupling between polymers or introduction of the ethylenically unsaturated group to the polymer. Such compounds include, for example, nonconjugated dienes, such as 1,7-octadiene (specifically, compounds expressed by general formula 9 (in formula 9, one or both of $R^{14}$ and $R^{16}$ are a hydrogen atom)).

Compounds containing an ethylenically unsaturated group and having a functional group such as hydroxy or amino may also be used advantageously. In this instance, the functional group, such as hydroxy or amino, can be introduced to the polymer.

The process of the reaction between the terminal halogen of the vinyl polymer having a group expressed by general formula (C) at the terminus and the compound containing an ethylenically unsaturated group expressed by general formula (E) is not particularly limited, but preferably, a "reaction system of atom transfer radical polymerization" is used. The "reaction system of atom transfer radical polymerization"

refers to a reaction system used in atom transfer radical polymerization. Specifically, the vinyl polymer having a group expressed by general formula (C) is used as an equivalent to a halide serving as the initiator of atom transfer radical polymerization, and the halogen of the vinyl polymer is allowed to react with the compound containing an ethylenically unsaturated group under conditions suitable for atom transfer radical polymerization with use of transition metal complex, ligand, activator, solvent, and so forth suitable for the atom transfer radical polymerization. Therefore, the process is not necessarily performed such that the compound containing an ethylenically unsaturated group is added to a system of atom transfer radical polymerization of a vinyl polymer during the polymerization or at the end of the polymerization so that the step of polymerization of the vinyl monomer and the step of reaction between the vinyl polymer and the compound containing an ethylenically unsaturated group are performed in one pot. The reaction between the vinyl polymer and the compound containing an ethylenically unsaturated group may be performed under conditions of atom transfer radical polymerization, separately from the step of polymerization of the vinyl monomer. The conditions of polymerization of a vinyl monomer and the conditions of the reaction between the vinyl polymer and the compound (1) containing an ethylenically unsaturated group are the same or different.

The dehalogenation of the group expressed by general formula (C) causes molecular weight jump of the vinyl polymer. Therefore, if the molecular weight jump is a problem, it is preferable to transform the group expressed by general formula (C) into a group expressed by general formula (D) as much as possible. If the group expressed by general formula (C) is not completely transformed and thus the vinyl polymer is in a mixture form of a vinyl polymer having the group expressed by general formula (C) and a vinyl polymer having the group expressed by general formula (D), the ratio of the group expressed by general formula (C) to the group expressed by general formula (D), [mole number of the group expressed by general formula (C)]/[mole number of the group expressed by general formula (D)], is preferably in the range of 0.01 to 0.2, more preferably 0.01 to 0.1, and still more preferably 0.01 to 0.05. Also, the content of the group express by general formula (C) is preferably in the range of 0.1 to 10 mmol per kilogram of the mixture, more preferably 0.1 to 5.0 mmol, and particularly preferably 0.1 to 3.0 mmol.

For determination of the number of the groups expressed by general formula (C) per one molecule of the vinyl polymer, the halogen of the group expressed by general formula (C) in the vinyl polymer is replaced with a carboxylate having a group capable of being detected by an analyzer and, then, the detectable group is subjected to determination with the analyzer.

For determination of the amount (mole number) of the groups expressed by general formula (C) per a unit weight of the vinyl polymer, the halogen of the group expressed by general formula (C) in the vinyl polymer is replaced with a carboxylate having a group capable of being detected by an analyzer and, then, the detectable group is subjected to determination with the analyzer.

Exemplary analyzers include, but not limited to, nuclear magnetic resonance spectrometers, ultraviolet and visible spectrophotometers, infrared spectrophotometers, atomic absorption spectrophotometers, and gel permeation chromatographs.

The carboxylates having a group capable of being detected by such analyzers include, but not particularly limited to, carboxylates having a carbon-carbon double bond, such as (meth)acrylates, and carboxylates having a benzene ring, such as benzoates.

For determination, preferably, two or more types of analyzer are used. In particular, a combination of nuclear magnetic resonance spectroscopy (NMR) and gel per permeation chromatography (GPC) is preferable.

The dehalogenation step may be performed in a reaction mixture form of the atom transfer radical polymerization, or may be performed after purification, transformation of a functional group, or other treatment, or during these steps.

If a halogen compound removed from the polymer by dehalogenation negatively affect the quality of the product and manufacturing equipment, it is preferable to perform the dehalogenation step while the halogen compound is removed under reduced pressure. Preferably, the reduced pressure is 100 Torr or less, more preferably 20 Torr or less, and still more preferably 10 Torr or less. Since heat treatment under reduced pressure is easily affected by surface renewal, stirring is preferably applied so as to perform the treatment in a good surface renewal state.

In the known dehalogenation processes, a basic compound is added. In the present invention, a basic compound may also be added in the dehalogenation step. However, oxyanion compounds, which are one type of basic compounds, are not suitable additives for the process of-the present invention because they serve as a nucleophilic substitution agent and are difficult to remove from the vinyl polymer. In particular, carboxylates used as an additive remain in the vinyl polymer in a carboxylic acid or a carboxylate form, consequently causing problems of an odor and degradation in storage stability. In contrast, inorganic bases are relatively easy to remove, and are accordingly suitable for the present invention. Such an inorganic base is not particularly limited, but preferably, an alkali metal hydroxide or an alkali metal hydroxide is used.

In the present invention, the dehalogenation step may be performed in the presence of an inorganic adsorbent, such as synthetic hydrotalcite, aluminium silicate, and magnesium oxide. Thus, a catalyst remaining in the polymer can be reduced, and by-produced acid substances can be easily removed. The inorganic adsorbent functions as an aggregation nucleus of the insolubilized transition metal complex, and promises to exhibit chemical adsorption.

Typical inorganic adsorbents are essentially composed of aluminium, magnesium, or silicon singly or in combination. For example, such adsorbents include silicon dioxide, magnesium oxide, silica gel, silica alumina, aluminium silicate, activated alumina, clay adsorbents such as acid clay and activated clay; zeolite adsorbents collectively referred to as hydrous alumino-silicate minerals such as aluminium sodium silicate, dawsonite compounds, and hydrotalcite compounds. Among these, particularly preferred are aluminium silicate and hydrotalcite compounds.

Aluminium silicate comprises silicic acid whose silicon is partly replaced with aluminium, and known aluminium silicates include pumice, fly ash, kaolin, bentonite, activated clay, and diatomaceous earth. In particular, synthetic aluminium silicate has large specific surface area and high adsorptivity. The synthetic aluminium silicate is, for example, Kyowaad 700 series (produced by Kyowa Chemical Industry), but not limited to this.

The hydrotalcite compounds comprise a hydrous hydroxide of a divalent metal ($Mg^{2+}$, $Mn^{2+}$, $Fe^{2+}$, $Co^{2+}$, $Ni^{2+}$, $Cu^{2+}$, $Zn^{2+}$, etc.) and a trivalent metal ($Al^{3+}$, $Fe^{3+}$, $Cr^{3+}$, $Co^{3+}$, $In^{3+}$, etc.) or the hydrous hydroxide whose hydroxy group is partly replaced with an anion, such as a halogen ion, $NO_3^-$, $Co_3^{2-}$, $SO_4^{2-}$, $Fe(CN)_6^{3-}$, $CH_3CO_2^-$, an oxalic ion, or a salicylic ion. Among these, preferred is a hydrotalcite which contains $Mg^{2+}$ as the divalent metal and $Al^{3+}$ as the trivalent metal and whose hydroxy group is partly replaced with $CO_3^{2-}$. For example, synthetic hydrotalcites include, but not limited to, Kyowaad 500 series and Kyowaad 1000 series (each produced by Kyowa Chemical Industry). An adsorbent prepared by firing the above-described hydrotalcites is also used advantageously. In particular, $MgO$—$AlO_3$ solid solution obtained by firing hydrotalcites containing $Mg^{2+}$ as the divalent metal and $Al^{3+}$ as the trivalent metal is suitable. For example, Kyowaad 2000 (produced by Kyowa Chemical Industry) is used, but not limited to this. In the present invention, hydrotalcites include fired hydrotalcites. The adsorbents enumerated above may be used singly or in combination.

The amount of adsorbent used is generally in the range of 0.1 to 10 parts by weight relative to 100 parts by weight of the polymer, and preferably in the range of 0.1 to 5 parts by weight from the viewpoint of economical efficiency and workability.

If high-temperature heat treatment in the dehalogenation step degrades the polymer, dehalogenation may be performed in the presence of a radical scavenger. Such radical scavengers include oxygen radical scavengers and carbon radical scavengers.

Conventionally known antioxidants, age resistors, light stabilizer, and the like may be used as the oxygen radical scavenger.

Various types of antioxidant have been known, including antioxidants listed in "Sankaboushi-zai handbook" published by Taiseisha and "Koubunshi zairyou no Rekka to Annteika" (235-242) published by CMC Publishing, but antioxidant is not limited to these.

Examples of them include thioether-based antioxidants, such as MARK PEP-36 and MARK AO-23 (each produced by Adeka Argus Chemical), and phosphorous antioxidants, such as Irgafos 38, Irgafos 168, Irgafos P-EPQ (each produced by Ciba Geigy Japan). Among others, preferred are hindered phenol compounds enumerated below.

Hindered phenol compounds include: 2,6-di-tert-butyl-4-methylphenol, 2,6-di-tert-butyl-4-ethylphenol, mono (di or tri) (α methylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butyl-hydroquinone, 2,5-di-tert-amylhydroquinone, triethylene glycol-bis-[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thio-diethylenebis[3-(3,5-di-t-butyl-4-hydroxyphenyl) propionate], octadecyl-3-(3,5-di-t-butyl-4-hydroxyphenyl) propionate, N,N'-hexamethylenebis(3,5-di-t-butyl-4-hydroxy-hydrocinnamamide), 3,5-di-t-butyl-4-hydroxy-benzylphosphonate-diethyl ester, 1,3,5-trimethyl-2,4,6-tris(3,5-di-t-butyl-4-hydroxybenzyl)benzene, calcium bis(ethyl 3,5-di-t-butyl-4-hydroxybenzylphosphonate), tris-(3,5-di-t-butyl-4-hydroxybenzyl)isocyanurate, 2,4-2,4-bis[(octylthio) methyl]o-cresol, N,N'-bis[3-(3,5-di-t-butyl-4-hydroxyphenyl)propionyl]hydrazine, tris(2,4-di-t-butylphenyl) phosphite, 2-(5-methyl-2-hydroxyphenyl)benzotriazole, 2-[2-hydroxy-3,5-bis (α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl) benzotriazole, 2-(2'-hydroxy-5'-t-octylphenyl)-benzotriazole, condensates with methyl-3-[3-t-butyl-5-(2H-benzotriazole-2-yl)-4-hydroxyphenyl]propionate-polyethylene glycol (molecular weight: about 300), hydroxyphenylbenzotriazole derivatives, bis(1,2,2,6,6-pentamethyl-4-piperidil) 2-(3,5-di-t-butyl-4-hydroxybenzyl)-2-n-butylmalonate, and 2,4-di-t-butylphenyl-3,5-di-t-butyl-4-hydroxybenzoate.

Trade names of exemplary antioxidants include, but not limited to: NOCRAC 200, NOCRAC M-17, NOCRAC SP, NOCRAC SP-N, NOCRAC NS-5, NOCRAC NS-6, NOCRAC NS-30, NOCRAC 300, NOCRAC NS-7, and NOCRAC DAH (each produced by Ooucho Shinko Kagaku Kogyo); MARK AO-30, MARK AO-40, MARK AO-50, MARK AO-60, MARK AO-616, MARK AO-635, MARK AO-658, MARK AO-80, MARK AO-15, MARK AO-18, MARK 328, and MARK AO-37(each produced by Adeka Argus Chemical); IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, IRGANOX-1425WL (each produced by Ciba Geigy Japan); and Sumilizer GA-80 (produced by Sumitomo Chemical).

The antioxidant may be used in combination with a light stabilizer. This is particularly preferable because the combination produces an enhanced effect and particularly increases heat resistance. Tinuvin C353 and Tinuvin B75 (each produced by Ciba Geigy Japan), which are mixtures of an antioxidant and a light stabilizer, and the like may be used.

The above-mentioned conventionally known radical scavenger generally produces effects in the presence of oxygen, and is therefore used for dehalogenation in the presence of oxygen, preferably.

If dehalogenation is performed in an atmosphere of nitrogen and a low concentration of oxygen under reduce presser, a carbon radical scavenger is preferably used.

Exemplary carbon radical scavengers include monoacrylate-phenol antioxidants having both an acrylate group and a phenol group, and nitroxide compounds. Monoacrylate-phenol antioxidants include 2-t-butyl-6-(3-t-butyl-2-hydroxy-5-methylbenzyl)-4-methylphenyl acrylate (trade name, SUMILIZER GM) and 2,4-di-t-amyl-6-[1-(3,5-di-t-amyl-2-hydroxyphenyl)ethyl]phenyl acrylate (trade name, SUMILIZER GS). Nitroxide compounds include, but not limited to, nitroxy free radicals derived from cyclic hydroxyamines, such as 2,2,6,6-substituted-1-piperidinyloxy radical and 2,2,5,5-substituted-1-pyrrolidinyloxy radical. Suitable substituents are alkyl groups having a carbon number of 4 or less, such as methyl and ethyl. Exemplary nitroxy free radical compounds include, but not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical, and N,N-di-t-butylaminoxy radical. Instead of nitroxy free radicals, other stable free radicals, such as galvinoxyl free radical, may also be used. Among these carbon radical scavengers, monoacrylate-phenol antioxidants are particularly preferable.

[Insoluble Contents Removal Step]

In the present invention, insoluble contents are, preferably, removed from the vinyl polymer after the dehalogenation step. Since such an additional step of removing the insoluble contents further increases the degree of purification and silylation activity, the amount of adsorbent used in a polymer purification step can be reduced and the purification step can be simplified.

"Insoluble contents" here refers to solid contents constituting a heterogeneous phase, produced by the polymerization reaction, reaction for introducing a functional group, dehalogenation reaction, and the like.

The insoluble content removal step is performed after the dehalogenation step. Another step may be performed between the dehalogenation and the insoluble content removal, but preferably, the insoluble content removal step follows the dehalogenation step.

In the insoluble content removal step, preferably, insoluble contents in the vinyl polymer are removed by solid-liquid separation. The solid-liquid separation is not particularly limited, and any known method may be applied, including filtration and sedimentation.

Examples of filtration include vacuum filtration with a Nutsche or the like and pressure filtration with a filter press or the like. For a small amount of filterable insoluble contents, a simple filtration using a cartridge filter or a bag filter, sand filtration, and the like are convenient.

Examples of sedimentation include stationary separation, decanter separation, and centrifugal sedimentation with a separate disk-type centrifugal settler.

For a combination of filtration and sedimentation, centrifugal filtration with a basket-type centrifugal filter and sedimentation filtration with a horizontal disk-type filter.

In filtration, a filter aid may be used according to the grain size and amount of the insoluble contents. The filter aid is not particularly limited, and a common material, such as diatomaceous earth, may be used.

If the vinyl polymer has so high a viscosity as to negatively affect the operational ease in solid-liquid separation, the vinyl polymer may be dissolved in a solvent. A common solvent may be used as the solvent without particular limitation, but preferably, a solvent having a polarity lower than that of the vinyl polymer because a solvent having a polarity higher than that of the vinyl polymer increases the solubility of the polymerization catalyst and the like. Since an excessively low polarity makes it difficult to dissolve the vinyl polymer, it is preferable to select an appropriate solvent according to the vinyl polymer. In order to adjust the polarity of the solvent, two or more types of solvent may be blended. For a vinyl polymer of a (meth)acrylic ester, hydrocarbon compounds are advantageously used, such as toluene, xylene, hexane, and methylcyclohexane. The solid-liquid separation may be performed by heating the vinyl polymer or heating a mixture including the vinyl polymer.

If a higher purification degree or silylation activity is required as a parameter of the quality of the vinyl polymer, an additional step of purification with an adsorbent may be combined if necessary.

The adsorbent is not particularly limited, but the above-enumerated inorganic adsorbents may be use.

Various methods are possible for solid-liquid contact between an inorganic adsorbent and the vinyl polymer or polymer solution. Exemplary methods include a batch method in which mixing with stirring and solid-liquid separation are performed by batch operation, a fixed-bed method in which the polymer solution flows through a container filled with an adsorbent, a moving bed method in which the solution flows through an adsorbent in a moving bed, and a fluidized bed method in which an adsorbent fluidized for adsorption. In addition to mixing and dispersion by stirring, if necessary, any other operation for enhancing the dispersion efficiency may be applied, such as shaking of the container and use of ultrasonic waves. After bringing the polymer or polymer solution into contact with an adsorbent, the adsorbent is removed by filtration, centrifugation, sedimentation, or the like. Then, if necessary, the polymer or polymer solution is dissolved or water is added, and thus, a clear solution of a targeted polymer is obtained.

This adsorption step may be performed in any stage of aftertreatment steps. For example:
(1) Adsorption is performed before the dehalogenation step,
(2) Heat treatment for dehalogenation is performed in the presence of adsorbent,
(3) Adsorption is performed after heat treatment in the dehalogenation step, and then the adsorbent is separated and collected while insoluble contents are removed, or
(4) Adsorption is performed after the insoluble content removal step.

The adsorption may be performed in a solvent-diluted form and/or with heating, if necessary.

The vinyl polymer produced by atom transfer radical polymerization is given a high hydrosilylation activity through the process of the present invention, and is accordingly used as one constituent of a hydrosilylation-reactive composition with great advantage. In particular, a vinyl polymer having an ethylenically unsaturated group in its molecule can be used as a reactive constituent of a hydrosilylation-reactive composition.

[Dehalogenated Vinyl Polymer]

The dehalogenated vinyl polymer can be used for various applications.

The molecular weight of the dehalogenated vinyl polymer is not particularly limited, but is preferably in the range of 1,000 to 10,0000 in terms of number average molecular weight. More preferably, the lower limit is 5,000 or more. More preferably, the upper limit is 50,000 or less. The molecular weight distribution of the dehalogenated vinyl polymer is not particularly limited, but is preferably in the range of 1.05 to 1.50. More preferably, the lower limit is 1.10 or more. More preferably, the upper limit is 1.40 or less.

Since the dehalogenation of the present invention reduces the amount of halogenation, it becomes easy to introduce a hydrolyzable group unstable against acids (for example, an alkoxysilyl group or the like) into a vinyl polymer. In addition, the risk of corrosion of manufacturing equipment and metal materials due to occurrence of acid is reduced. The amount of remaining halogen in the vinyl polymer can be 1,000 mg or less per kilogram of the vinyl polymer, preferably 500 mg or less, more preferably 100 mg or less, after dehalogenation in the process of the present invention. The amount of remaining halogen is determined by elementary analysis.

The vinyl polymer having an ethylenically unsaturated group in its molecule is cured by crosslinking with use of an appropriate cross-linker. Also, the vinyl polymer having an ethylenically unsaturated group in its molecule produces, for example, a vinyl polymer having an alkoxysilyl group by hydrosilylation with a hydrosilane compound having an alkoxysilyl group. The vinyl polymer having an alkoxysilyl group is also cured. The ethylenically unsaturated group is not particularly limited, but is preferably $CH_2=CH-$ and $CH_2=C(CH_3)-$, more preferably $CH_2=CH-$. The number of functional groups in one polymer molecule is not particularly limited, but the lower limit is preferably 0.5 or more, more preferably 0.8 or more, still more preferably 1.0 or more, still further preferably 1.2 or more, and particularly preferably 1.5 or more. The upper limit is preferably 5.0 or less, more preferably 4.0 or less, still more preferably 3.0 or less, and particularly preferably 2.5 or less. The position of the functional group is not particularly limited. If the functional group is used as a crosslinkable reactive group, it is positioned preferably close to the terminus of the chain, and more preferably in the terminus of the chain.

For preparing the vinyl polymer having an ethylenically unsaturated group in its molecule, a vinyl monomer having an ethylenically unsaturated group may be copolymerized when a vinyl monomer is subjected to atom transfer radical polymerization, or a compound containing a plurality of ethylenically unsaturated groups may be used when the group expressed by general formula (C) is transformed into the group expressed by general formula (D). The former is a simple method for introducing an ethylenically unsaturated group in the molecule, but it is difficult to control the number and introduction position of ethylenically unsaturated groups. On the other hand, the latter method allows the ethylenically unsaturated group to be selectively introduced to the terminus of the chain, and the compound containing ethylenically unsaturated groups is used as a transformer of the halogen structure and an agent for introducing the ethylenically unsaturated group; hence the latter method is advantageous.

[Hydrosilylation-Reactive Composition]

The hydrosilylation-reactive compositions contains: (A) a vinyl polymer having an ethylenically unsaturated group in its molecule; and (B) a compound containing a hydrosilyl group, for instance.

Constituent A is a vinyl polymer having an ethylenically unsaturated group ($CH_2=CH-$) in its molecule produced by the above-described method and may have been dehalogenated. Constituent B, a hydrosilyl group-containing compound, is not particularly limited, and various types can be used. Exemplary hydrosilyl group-containing compounds include compounds having at least 1.1 hydrosilyl groups in its molecule and hydrosilane compounds having a crosslinkable silyl group together with a hydrosilyl group. The following describes hydrosilylation-reactive compositions concretely.

<Hydrosilylation-reactive Composition (1)>

If constituent B is a compound having at least 1.1 hydrosilyl groups in its molecule, the compound is cured by hydrosilylation. Hence, the hydrosilylation-reactive compound is a curable composition (curable composition (1)).

Such compounds having at least 1.1 hydrosilyl groups in their molecule include, but not particularly limited to, chain polysiloxanes expressed by general formulas (22) and (23):

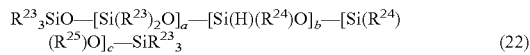

(22)

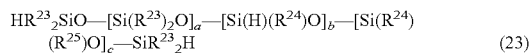

(23)

(wherein $R^{23}$ and $R^{24}$ each represent an alkyl group having a carbon number in the range of 1 to 6 or a phenyl group; $R^{25}$ represents an alkyl or aralkyl group having a carbon number in the range of 1 to 10; and a, b, and c are integers satisfying $0 \leq a \leq 100$, $2 \leq b \leq 100$, and $0 \leq c \leq 100$, respectively); and cyclic siloxanes expressed by general formula (24):

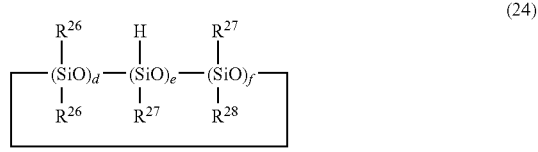

(24)

(wherein $R^{26}$ and $R^{27}$ each represent an alkyl group having a carbon number in the range of 1 to 6 or a phenyl group; $R^{28}$ represents an alkyl or aralkyl group having a carbon number in the range of 1 to 10; and d, e, and f are integers satisfying $0 \leq d \leq 8$, $2 \leq e \leq 10$, $0 \leq f \leq 8$, and $3 \leq d+e+f \leq 10$).

These compounds may be used singly or in combination. Among these siloxanes, preferred are chain siloxanes having a phenyl group expressed by following general formulas (25) and (26) and cyclic siloxanes expressed by general formulas (27) and (28), from the viewpoint of compatibility with the vinyl polymer.

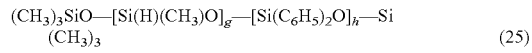

(25)

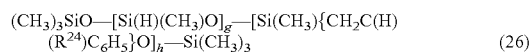

(26)

(In the formulas, $R^{24}$ represents a hydrogen atom or the methyl group; g and h represent integers satisfying $2 \leq g \leq 100$ and $0 \leq h \leq 100$, respectively; and $C_6H_5$ represents the phenyl group.)

(27)

(28)

(In the formulas, $R^{29}$ represents a hydrogen atom or the methyl group; i and j represent integers satisfying $2 \leq i \leq 10$ and $0 \leq j \leq 8$, and $3 \leq i+j \leq 10$; and $C_6H_5$ represents the phenyl group.)

In addition, a compound may be used as constituent B being a compound having at least 1.1 hydrosilyl groups in its molecule, the compound being prepared by addition reaction of a hydrosilyl group-containing compound expressed by one of general formulas (22) to (28) with a low-molecular-weight compound having at least two ethylenically unsaturated groups ($CH_2=CH-$) in its molecule so that part of the hydrosilyl groups remains after the reaction. Various types can be used as the compound having at least two ethylenically unsaturated groups ($CH_2=CH-$), and examples include: hydrocarbons, such as 1,4-pentadiene, 1,5-hexadiene, 1,6-heptadiene, 1,7-octadiene, and 1,8-nonadiene, and 1,9-decadiene; ethers, such as O,O'-diallyl bisphenol A and 3,3'-diallyl bisphenol A; esters, such as diallyl phthalate, diallyl isophthalate, triallyl trimellitate, and tetraallyl pyromellitate; carbonates, such as diethylene glycol diallyl carbonate.

The above-described compound containing ethylenically unsaturated groups is slowly dripped to an excessive amount of hydrosilyl group-containing compound expressed by general formulas (22) to (28) in the presence of a hydrosilylation catalyst, and thus the compound is obtained. Preferably, the compound thus prepared has the following structures, from the viewpoint of availability of the raw materials, ease of removal of the excessively used siloxane, and compatibility with the vinyl polymer.

as diisopropyl perdicarbonate and di-2-ethylhexyl perdicarbonate; and peroxy ketals, such as 1,1-di(t-butylperoxy)cyclohexane, and 1,1-di(t-butylperoxy)-3,3,5-trimethylcyclohexane.

Exemplary transition metals include, but not also particularly limited to, elemental platinum, disperse systems containing solid platinum dispersed in a carrier, such as alumina, silica, or carbon black, chloroplatinic acid, complexes of chloroplatinic acid and an alcohol, aldehyde, or ketone, plati-

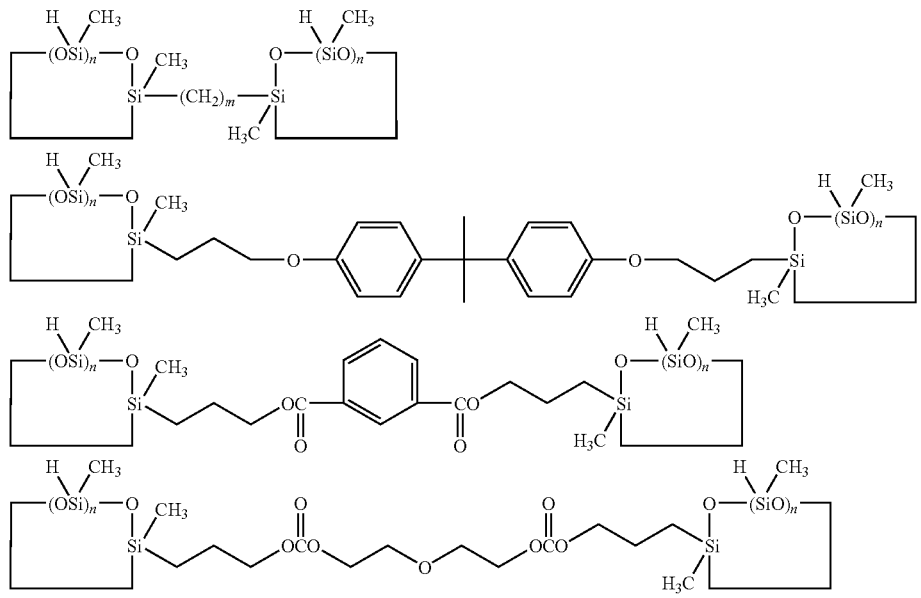

(n represents an integer in the range of 2 to 4, and m represents an integer in the range of 5 to 10.)

The vinyl polymer being constituent A and the hydrosilyl group-containing compound being constituent B may be mixed in an arbitrary ratio, but preferably, the molar ratio of the ethylenically unsaturated group ($CH_2=CH-$) to the hydrosilyl group is in the range of 5 to 0.2, and more preferably 2.5 to 0.4, from the viewpoint of curing ability. A molar ratio of 5 or more results in an insufficient cure and the resulting cured material is gummy and exhibits a low strength. A molar ratio of less than 0.2 causes a large amount of the active hydrosilyl group to remain in the cured material. Consequently, the resulting cured material has cracks and voids, and is thus nonuniform.

The curing reaction between the vinyl polymer of constituent A and the hydrosilyl group-containing compound of constituent B proceeds by heating. In order to increase the reaction rate, a hydrosilylation catalyst may be added. Exemplary hydrosilylation catalysts include, but not particularly limited to, organic peroxides, radical initiators such as azo compounds, and transition metal catalysts.

Exemplary radical initiators include, but not particularly limited to, dialkyl peroxides, such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butylcumyl peroxide, and α,α'-bis(t-butylperoxy)isopropylbenzene; acyl peroxides, such as benzoyl peroxide, p-chlorobenzoyl peroxide, m-chlorobenzoyl peroxide, 2,4-dichlorobenzoyl peroxide, and lauroyl peroxide; peracid esters, such as t-butyl perbenzoate; peroxy dicarbonates, such num-olefin complexes, and platinum (O)-divinyltetramethyldisiloxane complexes. Catalysts other than platinum compounds include $RhCl(PPh_3)_3$, $RhCl_3$, $RuCl_3$, $IrCl_3$, $FeCl_3$, $AlCl_3$, $PdCl_2 \cdot H_2O$, $NiCl_2$, and $TiCl_4$.

These catalysts may be used singly or in combination.

The catalyst content is not particularly limited, but preferably in the range of $10^{-1}$ to $10^{-8}$ mol per mol of the ethylenically unsaturated group ($CH_2=CH-$) of constituent (A), more preferably $10^{-3}$ to $10^{-6}$ mol. A catalyst content of less than $10^{-8}$ mol does not allow curing to proceed sufficiently. Hydrosilylation catalysts are generally expensive and corrosive, and can generate a large amount of hydrogen gas to cause the cured material to expand. It is therefore preferable that the amount of hydrosilylation catalyst used be limited to $10^{-1}$ mol or less.

Curing temperature is not particularly limited, but generally in the range of 0 to 200° C., preferably 30 to 150° C., and more preferably 80 to 150° C. Thus, a curable composition can be prepared in a shot time.

<Hydrosilylation-reactive Composition (2)>

A hydrosilane compound having a crosslinkable silyl group together with a hydrosilyl group may also be used as the hydrosilyl group-containing compound being constituent B.

Such hydrosilane compounds having a crosslinkable silyl group are not particularly limited, but are typically expressed by general formula 29:

$$H-[Si(R^{11})_{2-b}(Y)_bO]_m-Si(R^{12})_{3-a}(Y)_a \quad (29)$$

{$R^{11}$ and $R^{12}$ each represent an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$ (where three R' represent a hydrocarbon group having a carbon number in the range of 1 to 20, and may be the same or different). If the number of $R^{11}$ or $R^{12}$ is two or more, those $R^{11}$ or $R^{12}$ may be the same or different. Y represents a hydroxy group or a hydrolyzable group, and if the number of Y is two or more, they may be the same or different. a represents 0, 1, 2, or 3, and b represents 0, 1, or 2. m represents an integer in the range of 0 to 19. The relationship $a+mb \geqq 1$ holds.}

Exemplary hydrolyzable groups include generally used groups, such as a hydrogen atom and alkoxy, acyloxy, ketoximate, amino, amido, aminoxy, mercapto, and alkenyloxy groups. Among these, preferred groups are alkoxy, amido, and aminoxy, and particularly alkoxy because of its mild hydrolyzability and easy handling.

One to three of hydrolyzable groups or hydroxy groups can bond to one silicon atom, and preferably $(a+\Sigma b)$ is in the range of 1 to 5. If at least two hydrolyzable groups or hydroxy groups bond to the crosslinkable silyl group, they may be the same or different. The number of silicon atoms of the crosslinkable silyl group may be 1 or more, but if the silicon atoms are coupled by a siloxane bond or the like, the number of silicon atoms is preferably 20 or less.

Among these hydrosilane compounds, particularly preferred are compounds having a crosslinkable group expressed by general formula 30, from the viewpoint of availability.

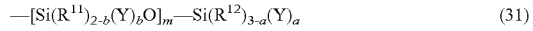
$$H-Si(R^{12})_{3-a}(Y)_a \qquad (30)$$

(In the formula, $R^{12}$, Y, and a are the same as above.)

By hydrosilylating the hydrosilylation-reactive composition using the above-described hydrosilane compound as constituent B, a vinyl polymer having a crosslinkable silyl group in its molecule is produced. This vinyl polymer and the curable composition containing this vinyl polymer (curable composition (2)) are also included in the present invention.

The number of the crosslinkable silyl groups in the molecule of the vinyl polymer is not particularly limited. However, if the vinyl polymer is used as a base polymer of a curable composition, it is preferable to contain an average number of 1.1 crosslinkable silyl groups in the molecule.

The molecular weight of the vinyl polymer having a crosslinkable silyl group is not particularly limited, but - is preferably in the range of 1,000 to 10,0000 in terms of number average molecular weight. The lower limit is more preferably 5,000 or more, and the upper limit is more preferably 50,000 or less. The molecular weight distribution of the vinyl polymer having a crosslinkable silyl group is not particularly limited, but is preferably in the range of 1.05 to 1.50. More preferably, the lower limit is 1.10 or more. More preferably, the upper limit is 1.40 or less.

The crosslinkable silyl group of the present invention is typically expressed by general formula 31:

$$-[Si(R^{11})_{2-b}(Y)_bO]_m-Si(R^{12})_{3-a}(Y)_a \qquad (31)$$

{$R^{11}$ and $R^{12}$ each represent an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$ (where three R' represent a hydrocarbon group having a carbon number in the range of 1 to 20, and may be the same or different). If the number of $R^{11}$ or $R^{12}$ is two or more, those $R^{11}$ or $R^{12}$ may be the same or different. Y represents a hydroxy group or a hydrolyzable group, and if the number of Y is two or more, they may be the same or different. a represents 0, 1, 2, or 3, and b represents 0, 1, or 2. m represents an integer in the range of 0 to 19. The relationship $a+mb \geqq 1$ holds.}

Exemplary hydrolyzable groups include generally used groups, such as a hydrogen atom and alkoxy, acyloxy, ketoximate, amino, amido, aminoxy, mercapto, and alkenyloxy groups. Among these, preferred groups are alkoxy, amido, and aminoxy, and particularly alkoxy because of its mild hydrolyzability and easy handling.

One to three of hydrolyzable groups or hydroxy groups can bond to one silicon atom, and preferably $(a+\Sigma b)$ is in the range of 1 to 5. If at least two hydrolyzable groups or hydroxy groups bond to the crosslinkable silyl group, they may be the same or different. The number of silicon atoms of the crosslinkable silyl group may be 1 or more, but if the silicon atoms are coupled by a siloxane bond or the like, the number of silicon atoms is preferably 20 or less. In particular, compounds having a crosslinkable group expressed by general formula 32 are particularly preferable from the viewpoint of availability.

$$-Si(R^{12})_{3-a}(Y)_a \qquad (32)$$

(In the formula, $R^{10}$, Y and a are the same as above.)

If the cured material produced by curing the vinyl polymer having a crosslinkable silyl group of the present invention particularly requires rubber characteristics, at least one crosslinkable silyl group is present at a terminus of the chain because such a structure ensures a high molecular weight between crosslinking points, which largely affects rubber elasticity. More preferably, all the functional groups are present at the terminus of the chain.

The ratio of the vinyl polymer being constituent A to the crosslinkable silyl group-containing hydrosilane compound being constituent B is not particularly limited, but preferably, the amount of the hydrosilyl group is more than or equivalent to that of the ethylenically unsaturated group ($CH_2=CH-$).

In order to increase the reaction rate of hydrosilylation, a hydrosilylation catalyst may be added. The above-enumerated compounds may be used as the hydrosilylation catalyst.

Reaction temperature is not particularly limited, but generally in the range of 0 to 200° C., preferably 30 to 150° C., and more preferably 80 to 150° C.

For curing curable composition (2), a condensation catalyst may or may not be used. Exemplary condensation catalysts include: titanic esters, such as tetrabutyl titanate and tetrapropyl titanate; organic tin compounds, such as dibutyltin dilaurate, dibutyltin diacetylacetonate, dibutyltin maleate, dibutyltin diacetate, dibutyltin dimethoxide, tin octylate, and tin naphthenate; lead octylate; amine compounds and their carboxylates, such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, and 1,3-diazabicyclo(5,4,6) undecen-7; reaction products and mixtures of an amine compound and an organic tin compound, such as a reaction product or mixture of laurylamine and tin octylate; low-molecular-weight polyamide resins prepared from an excessive amount of polyamine and a polybasic acid; reaction products of an excessive amount of polyamine and an epoxy compound; and silane couplers having an amino group, for example silanol catalysts, such as γ-aminopropyltrimethoxysilane and N-(β-aminoethyl)aminopropylmethyldimethoxysilane. These catalysts may be used singly or in combination as needed. The amount used is preferably in the range of 0 to 10 percent by weight relative to the vinyl polymer containing a crosslinkable silyl group. If an alkoxy group is used as the hydrolyzable group Y, it is preferable to add a curing catalyst because the curing rate of the polymer alone is low.

<Curable Composition>

In order to control the characteristics of curable compositions (1) and (2), various types of additives may be appropriately added as needed, such as fire retardants, antiaging agents, fillers, plasticizers, physical property adjusters, reaction diluents, adhesion imparters, storage stability improvers, solvents, radical inhibitors, metal-inactivating agents, ozone degradation inhibitors, phosphorous peroxide decomposers, lubricants, pigments, blowing agents, and photocurable resins. These additives may be used singly or in combination.

Although an antiaging agent is not always necessary because of inherent high durability of the vinyl polymer, a conventionally known antioxidant, UV absorber, light stabilizer, and the like may appropriately be used.

<Filler>

Compoundable fillers include, but not particularly limited to, reinforcing fillers to provide strength and other physical properties, such as silica fine powder, calcium carbonate, talc, titanium oxide, diatomaceous earth, barium sulfate, carbon black, surface-treated fine calcium carbonate, fired clay, clay, and active hydrozincite. These reinforcing fillers may be used singly or in combination. Among these, silica fine powder is preferably used, such as hydrated silica prepared by a wet process or dry silica prepared by a dry process. If the composition contains a lot of water, a side reaction can occur during curing reaction. Therefore, anhydrous silica is particularly preferable. More preferably, the surface of anhydrous silica is subjected to hydrophobic treatment, thus exhibiting a fluidity suitable for forming. Another filler having less reinforcing characteristic may also be used to increase the amount or adjust the physical properties.

<Plasticizer>

Plasticizer is used to control the physical properties and adjust the material state. Exemplary plasticizers include, but not particularly limited to, phthalic esters, such as dibutyl phthalate, diheptyl phthalate, di(2-ethylhexyl)phthalate, and butylbenzyl phthalate; non-aromatic dibasic acid esters, such as dioctyl adipate, dioctyl sebacate, dibutyl sebacate, and isodecyl succinate; aliphatic esters, such as butyl oleate and methyl acetylricinoleate; polyalkylene glycol esters, such as diethylene glycol dibenzoate, triethylene glycol dibenzoate, and pentaerythritol esters; phosphoric esters, such as tricresyl phosphate and tributyl phosphate; trimellitic esters; polystyrenes, such as polystyrene and poly-α-methylstyrene; polybutadiene; polybutene; polyisobutylene; butadiene-acrylonitrile; polychloroprene; chlorinated paraffins; hydrocarbon oils, such as alkyl diphenyls and partially hydrogenated terphenyl; process oils; polyether polyols, such as polyethylene glycol, polypropylene glycol, and polytetramethylene glycol, and polyethers of their derivatives in which the hydroxy group of the polyether polyol is replaced with an ester group, an ether group, or the like; epoxy plasticizers, such as epoxidized soybean oil and benzyl epoxystearate; polyester plasticizers obtained from a dibasic acid, such as sebacic acid, adipic acid, azelaic acid, or phthalic acid, and a dihydric alcohol, such as ethylene glycol, diethylene glycol, triethylene glycol, propylene glycol, and dipropylene glycol; and vinyl polymers prepared from vinyl monomers by various processes, including acrylic plasticizers. These plasticizers may be used singly or in combination, but are not always needed. The plasticizer may be compounded on the occasion of polymerization.

<Storage Stability Improver>

Any storage stability improver can be compounded as long as it can prevent the viscosity of the composition from increasing, and the curing rate from extremely varying after storage. For example, benzothiazole or dimethyl maleate is used.

<Solvent>

Compoundable solvents include, for example: aromatic hydrocarbon solvents, such as toluene and xylene; ester solvents, such as ethyl acetate, butyl acetate, amyl acetate, and cellosolve acetate; and ketone solvents, such as methyl ethyl ketone, methyl isobutyl ketone, and diisobutyl ketone The solvent may be used on the occasion of polymerization.

<Adhesion Imparter>

Any adhesion imparter can be used as long as it can give adhesion to the cured material. Preferably, compounds containing a crosslinkable silyl group, more preferably silane couplers, are used. Exemplary adhesion imparters include: alkylalkoxysilanes, such as methyltrimethoxysilane, dimethyldimethoxysilane, trimethylmethoxysilane, and n-propyltrimethoxysilane; alkylisopropenoxysilanes, such as dimethyldiisopropenoxysilane and methyltripropenoxysilane; silanes containing a vinyl-type unsaturated group, such as vinyltrimethoxysilane, vinyldimethylmethoxysilane, vinyltriethoxysilane, γ-methacryloyloxypropylmethyldimethoxysilane and γ-acryloyloxypropylmethyltriethoxysilane; silicone varnishes; and polysiloxanes.

In particular, preferred agents are silane couplers having a crosslinkable silyl group together with an organic group having an atom other than carbon and hydrogen, such as epoxy, (meth)acrylic, isocyanate, isocyanurate, carbamate, amino, mercapto, or carboxyl group. Examples of these silane couplers include: alkoxysilanes having an isocyanate group, such as γ-isocyanatepropyltrimethoxysilane, γ-isocyanatepropyltriethoxysilane, γ-isocyanatepropylmethyldiethoxysilane, γ-isocyanatepropylmethyldimethoxysilane, and other isocyanate-containing silanes; alkoxysilanes having an isocyanurate group, such as tris(trimethoxysilyl)isocyanurate and other isocyanurate silanes; alkoxysilanes having an amino group, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, and other amino group-containing silanes; alkoxysilanes having a mercapto group, such as γ-mercaptopropyltrimethoxysilane, γ-mercaptopropyltriethoxysilane, γ-mercaptopropylmethyldimethoxysilane, γ-mercaptopropylmethyldiethoxysilane, and other mercapto group-containing silanes; alkoxysilanes having a carboxyl group, such as β-carboxyethyltriethoxysilane, β-carboxyethylphenylbis(2-methoxyethoxy)silane, N-β-(carboxymethyl) aminoethyl-γ-aminopropyltrimethoxysilane, and other carboxysilanes; and alkoxysilanes having a halogen, such as γ-chloropropyltrimethoxysilane and other silanes having a halogen.

In addition, derivatives prepared by modifying these materials, such as amino-modified silyl polymers, silylated amino polymers, unsaturated aminosilane complexes, phenylamino long-chain alkylsilanes, aminosilylated silicones, and silylated polyesters, may be used as silane couplers.

Further preferred are alkoxysilanes having an epoxy group or a (meth)acrylic group in its molecule, from the viewpoint of curing properties and adhesion properties. Specifically, such alkoxysilanes include: alkoxysilanes having an epoxy group, such as γ-glycidoxypropylmethyldimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltrimethoxysilane, and γ-glycidoxypropylmethyldiisopropenoxysilane; alkoxysilanes having a (meth)acrylic group, such as γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, methacryloxymethyltriethoxysilane, acryloxymethyltrimethoxysilane, and acryloxymethyltriethoxysilane. These compounds may be used singly or in combination.

In order to further enhance the adhesion properties, a crosslinkable silyl group condensation catalyst may be used in combination with the adhesion imparter. Crosslinkable silyl group condensation catalysts include: organic tin compounds, such as dibutyltin dilaurate, dibutyltin diacetylacetonate, dibutyltin dimethoxide, and tin octylate; organic aluminium compounds, such as aluminium acetylacetonate; and organic titanium compounds, such as tetraisopropoxy titanium and tetrabutoxy titanium.

Examples other than silane couplers include, but not particularly limited to, epoxy resin, phenol resin, sulfur, alkyl titanates, and aromatic polyisocyanates.

Preferably, the adhesion imparter is compounded in an amount in the range of 0.01 to 20 parts by weight relative to 100 parts by weight of the vinyl polymer. An amount of less than 0.01 part by weight is less effective at improving adhesion, and an amount of more than 20 parts by weight negatively affects the physical properties of the resulting cured material. Preferably, the amount is in the range of 0.1 to 10 parts by weight, and more preferably in the range of 0.5 to 5 parts by weight.

The above-enumerated adhesion imparters may be used singly or in combination. By adding the adhesion imparter, the adhesion to an object to be adhered can be enhanced.

<Method of Molding or Forming>

The method for molding or forming the curable composition of the present invention to produce a molded form is not particularly limited, and various common methods may be applied, such as cast molding, compaction molding, transfer molding, injection molding, extrusion, rotational molding, blow molding, and thermoforming. In particular, injection molding is preferable because it allows automation and continuous operation, and provides superior productivity. For use as gaskets, both a wet process and a dry process can be applied, the wet type in which a curable composition applied to the surface of a flange or the like is sandwiched from both sides in an uncured state and then cured, and the dry type in which the composition is cured before being sandwiched.

<Applications>

Curable composition of the present invention can be used for, but not limited to, sealants such as elastic building sealant and double-grazed glass sealant, electrical or electronic components such as solar battery back backside sealant, electrical insulating materials such as wire/cable insulating coating, adhesives, elastic adhesives, paints, powdered paints, coatings, expanded materials, electrical or electronic potting materials, films, gaskets, casting materials, artificial marble, various types of molding materials, anticorrosive and waterproofing sealants for the ends (sections) of wire glass and laminated glass, and other various applications.

Molded forms prepared from the curable composition of the present invention are broadly used as gaskets and packing materials. For example, they can be used in the field of motor vehicles as body components, such as sealants for maintaining airtightness and anti-vibration materials for glass and bodies, and particularly as window sealing gaskets and door glass gaskets. For chassis components, the molded forms can be used as anti-vibration, soundproofing engine and suspension rubbers, and particularly as engine mount rubber. For engine components, they can be used as hoses for cooling, fuel supply, exhaust control, and the like and engine oil sealants. The molded forms can also be used as components of exhaust gas cleaning devices and brake components. For use in the field of household electrical appliances, the molded forms can be used as gaskets, O rings, belts and so forth. Specifically, examples include: decorations, waterproofing gaskets, anti-vibration rubbers, and insect repellent gaskets of lighting fixtures; anti-vibration, sound-absorbing sealants and air sealant for cleaners; drip-proof covers, waterproofing gaskets, heater gaskets, electrode gaskets, and safety valve diaphragms for electrical water heaters; hoses, waterproofing gaskets, and solenoid valves of hot sake makers; waterproofing gaskets, water tank gaskets, water suction valves, drip tray gaskets, joint hoses, belts, keep-warm heater gaskets, burning device oil gaskets, such as steam outlet seals, o rings, drain gaskets, pressure tubes, blower tubes, air supply/intake gaskets, anti-vibration rubbers, oil inlet gaskets, oil gauge gaskets, oil feed pipes, diaphragm valves, and airlines of steam oven stoves and jar rice cookers; and speaker gaskets, speaker edges, turntable sheets, belts, and pulleys of audio equipment. In the field of construction, the molded forms can be used as structural gaskets (zipper gaskets), air film structure roof materials, waterproofing materials, formed sealants, anti-vibration materials, soundproofing materials, setting blocks, sliding materials, and so forth. In the field of sports, the molded forms can be used as sports floors, such as all-weather pavement materials and gymnasium floors, shoe sole and inner sole materials for athletic shoes, and game balls, such as golf balls. In the field of anti-vibration rubbers, the molded forms can be used for motor vehicles, railway vehicles, and airplanes and as fender beams. In the field of offshore engineering, the molded forms can be used as structural materials, such as rubber expansion joints, bearings, weather bars, waterproofing sheets, rubber dams, elastic pavements, anti-vibration pads, and protective materials; secondary construction materials, such as rubber forms, rubber packers, rubber skirts, sponge mats, mortar hoses, and mortar strainers; construction subsidiary materials, such as rubber sheets and air hoses; safety articles, such as rubber buoys and wave suppressing materials; environment protection articles, such as oil fences, silt fences, antifoulants, marine hoses, dredging hoses, oil skimmers, and so forth. In addition, the molded forms can be used as other sheet rubbers, mats, and foam sheets.

Best Mode for Carrying Out the Invention

Specific examples of the present invention will now be described with comparative examples, but the invention is not limited to the examples.

In the examples and the comparative examples, "part(s)" and "%" represent "part(s) by weight" and "percent by weight", respectively.

In the examples, bromine group contents were determined by elementary analysis using ion chromatography of samples prepared by an oxygen-flask combustion method.

The "number average molecular weight" and the "molecular weight distribution (ratio of weight average molecular weight to number average molecular weight)" are calculated by standard polystyrene conversion using gel permeation chromatography (GPC), in which a column filled with a crosslinked polystyrene gel (shodex GPC K-804 and GPC K-802.5, produced by Showa Denko) was used as the GPC column; chloroform as the GPC solvent.

In the examples, the number of reactive functional groups (reactive functional group: "number of ethylenically unsaturated groups" or "number of silyl groups") introduced to one molecule of the polymer was calculated from the concentration determined by $^1$H-NMR analysis and the number average molecular weight obtained by GPC.

In the examples, the amount of the group expressed by general formula (C) in the vinyl polymer was obtained by an indirect method in which the halogen in the vinyl polymer having the group expressed by general formula (C) was replaced with potassium methacrylate and the concentration of the methacryloyl group in the vinyl polymer was measured by $^1$H-NMR.

In the examples, the ratio in the vinyl polymer of the group expressed by general formula (C) to the group expressed by general formula (D) was calculated from the following equation:

Ratio in the vinyl polymer of the group expressed by general formula (C) to the group expressed by general formula (D)=(amount of the group expressed by general formula (C) remaining in the vinyl polymer after reaction)/[(amount of the group expressed by general formula (C) in the vinyl polymer before reaction)−(amount of the group expressed by general formula (C) remaining in the vinyl polymer after reaction)]

The amounts of the group expressed by general formula (C) in the vinyl polymer before reaction and of the group expressed by general formula (C) remaining in the vinyl polymer after reaction refer to the amounts of the group expressed by general formula (C) present in the vinyl polymer before and after reaction between the compound containing an ethylenically unsaturated group and the polymer having a group expressed by general formula (C), and they were determined by the above-described method.

In the examples, the storage stability of polymers containing a methoxysilyl group was evaluated by the following accelerating test.

A polymer placed in a glass vessel was hermetically stored under heating conditions at 80° C. After 7 days, the vessel containing the polymer was cooled to room temperature, and the viscosity was measured. The storage stability was evaluated from the rate (%) of change in viscosity, that is, the viscosities of the polymer before heating at 80° C. and after storage for 7 days. A smaller change in viscosity means better storage stability.

In the examples, hydrosilylation activity was evaluated from the "amount of platinum catalyst consumed" obtained by the following method.

A predetermined amount of polymer, a chain siloxane having an average number of 5 hydrosilyl groups in its molecule (Si—H group, 3.70 mmol/g), and a platinum catalyst were uniformly blended to yield a composition, wherein the chain siloxane was prepared by modification in which part of the hydrosilyl groups of a chain siloxane having an average number of 10 hydrosilyl groups in its molecule was allowed to react with α-methylstyrene, and the platinum catalyst was a solution of bis(1,3-divinyl-1,1,3,3-tetramethyldisiloxane) platinum complex in xylene, hereinafter referred to as platinum catalyst. The composition was heated to 130° C. to gelate. Hydrosilylation activity was evaluated from the amount of the platinum catalyst consumed in terms of platinum when the gelating time was 30 seconds. A smaller amount of the platinum catalyst consumed refers to a higher hydrosilylation activity.

PREPARATION EXAMPLE 1

Transformation into a γ-bromo Ester Structure with 1,7-octadiene 1

(Polymerization of n-butyl Acrylate)

A 2 L separable flask equipped with a reflux tube and a stirrer was charged with CuBr (8.4 g, 58.5 mmol) and purged with nitrogen. Acetonitrile (112 mL) was added, followed by stirring at 70° C. for 30 minutes in an oil bath. Into the mixture were added n-butyl acrylate (200 g), diethyl 2,5-dibromoadipate (17.6 g, 48.8 mmol), and pentamethyldiethylenetriamine (0.407 mL, 0.338 g, 2.0 mmol) (hereinafter referred to as the triamine), and a reaction was started. n-butyl acrylate (800 g) was continuously dripped with heating at 70° C. The triamine was further added during dripping the n-butyl acrylate. (Reaction with 1,7-octadiene: transformation of the group expressed by general formula (C) in a vinyl polymer into the group expressed by general formula (D) and introduction of an ethylenically unsaturated group into the vinyl polymer)

At the point where the monomer reaction rate reached 96%, the remaining monomer and acetonitrile were devolatilized at 70° C. Then, 1,7-octadiene (144 mL, 107 g, 975 mmol) was added as the compound containing an ethylenically unsaturated group, and acetonitrile (336 mL) and triamine were further added, followed by stirring and heating at 70° C.

The amount of the group expressed by general formula (C) present in 1 kg of the vinyl polymer was 74 mmol immediately before the addition of 1,7-octadiene. The average number of the groups expressed by general formula (C) per one molecule of the polymer was calculated from the amount of the group expressed by general formula (C) and the number average molecular weight 22,200 obtained by GPC, and the result was 1.7. After the addition of 1,7-octadiene, the amount of the group expressed by general formula (C) remaining after reaction was 2.0 mmol per kilogram of the polymer. The average number of the groups expressed by general formula (C) per one molecule of the polymer was calculated from the amount of the remaining group expressed by general formula (C) and the number average molecular weight 24,000 obtained by GPC, and the result was 0.05. The resulting vinyl polymer obtained by the reaction with 1,7-octadiene was a mixture of a vinyl polymer having the group expressed by general formula (C) and a vinyl polymer having the group expressed by general formula (D). The ratio of the group expressed by general formula (C) to the group expressed by general formula (D) obtained from the calculation equation was 0.03.

(Removal of Polymerization Catalyst)

The reaction mixture was heated for devolatilization and diluted with toluene. The mixture was allowed to flow through an activated alumina column to remove the polymerization catalyst. The polymer solution was concentrated and dissolved in 100 parts of methylcyclohexane relative to the polymer. Then, 4 parts of an adsorbent (Kyowaad 500SH, 2 parts/Kyowaad 700SL, 2 parts, both produced by Kyowa Chemical Industry) was added, followed by heating and stirring in an atmosphere of a mixture of oxygen and nitrogen gases. Insoluble contents were removed, and the polymer solution was concentrated to yield a targeted polymer (polymer [1]).

(Physical Properties of Polymer)

Polymer [1] had a number average molecular weight of 23,800 and a molecular weight distribution of 1.23. The amount of bromine in polymer [1] obtained by elementary analysis was 4,900 mg per kilogram of the polymer.

COMPARATIVE EXAMPLE 1

Dehalogenation of poly(n-butyl acrylate) 1:
Treatment at 130° C.

Polymer [1] prepared in Preparation Example 1 was heated for devolatilization (reduced pressure: 10 Torr or less) at 130° C. for 6 hours to yield a poly(n-butyl acrylate) containing an ethylenically unsaturated group having a reduced amount of bromine. The amount of bromine in the polymer obtained by elementary analysis was 3,800 mg per kilogram of the polymer. The number average molecular weight was 24,300 and the molecular weight distribution was 1.23.

EXAMPLE 1

Dehalogenation of Poly(n-butyl Acrylate) 2:
Treatment at 150° C.

Polymer [1] prepared in Preparation Example 1 was heated for devolatilization (reduced pressure: 10 Torr or less) at 150° C. for 6 hours to yield a poly(n-butyl acrylate) containing an ethylenically unsaturated group having a reduced amount of bromine. The amount of bromine in the polymer obtained by elementary analysis was 870 mg per kilogram of the polymer. The number average molecular weight was 24,300 and the molecular weight distribution was 1.23.

EXAMPLE 2

Dehalogenation of Poly(n-butyl Acrylate) 3:
Treatment at 180° C.

Polymer [1] prepared in Preparation Example 1 was heated for devolatilization (reduced pressure: 10 Torr or less) at 180° C. for 6 hours to yield a poly(n-butyl acrylate) containing an ethylenically unsaturated group having a reduced amount of bromine. The amount of bromine in the polymer obtained by elementary analysis was 370 mg per kilogram of the polymer. The number average molecular weight was 24,100 and the molecular weight distribution was 1.25.

PREPARATION EXAMPLE 2

Transformation into a γ-Bromo Ester Structure with 1,7-octadiene 1-2

A targeted polymer (polymer [2]) was prepared through the same operations as in Preparation Example 1 (polymerization of n-butyl acrylate, reaction with 1,7-octadiene, and removal of polymerization catalyst).

(Physical Properties of Polymer)

Polymer [2] had a number average molecular weight of 24,700 and a molecular weight distribution of 1.32. The amount of bromine in polymer [2] obtained by elementary analysis was 3,400 mg per kilogram of the polymer. The number of ethylenically unsaturated groups introduced to one molecule of the polymer was 1.7.

EXAMPLE 3

Dehalogenation of Poly(n-butyl Acrylate) 4:
Treatment at 200° C.

Polymer [2] prepared in Preparation Example 2 was heated for devolatilization (reduced pressure: 10 Torr or less) at 200° C. for 3 hours to yield a poly(n-butyl acrylate) containing an ethylenically unsaturated group having a reduced amount of bromine. The amount of bromine in the polymer obtained by elementary analysis was 280 mg per kilogram of the polymer. The number average molecular weight was 25,900 and the molecular weight distribution was 1.34.

EXAMPLE 4

Dehalogenation of Poly(n-butyl Acrylate) 5:
Treatment at 235° C.

Polymer [2] prepared in Preparation Example 2 was heated for devolatilization (reduced pressure: 10 Torr or less) at 235° C. for 3 hours to yield a poly(n-butyl acrylate) containing an ethylenically unsaturated group having a reduced amount of bromine. The amount of bromine in the polymer obtained by elementary analysis was 100 mg or less per kilogram of the polymer. The number average molecular weight was 26,500 and the molecular weight distribution was 1.36.

PREPARATION EXAMPLE 3

Transformation into a γ-bromo Ester Structure with 1,7-octadiene 2

(Polymerization of Acrylic Esters: Copolymerization)

A 2 L separable flask equipped with a reflux tube and a stirrer was charged with CuBr (9.0 g, 62.8 mmol) and purged with nitrogen. Acetonitrile (103 mL) was added, followed by stirring at 70° C. for 30 minutes in an oil bath. Into the mixture were added n-butyl acrylate (54 g), ethyl acrylate (77 g), 2-methoxyethyl acrylate (63 g), diethyl 2,5-dibromoadipate (17.6 g, 48.8 mmol), and pentamethyldiethylenetriamine (0.44 mL, 0.36g, 2.1 mmol) (hereinafter referred to as triamine), and a reaction was started. A mixture of n-butyl acrylate (215 g), ethyl acrylate (308 g) and 2-methoxyethyl acrylate (253 g) was continuously dripped with heating at 70° C. The triamine was further added during dripping the monomers.

(Reaction with 1,7-octadiene)

At the point where the monomer reaction rate reached 97%, the remaining monomer and acetonitrile were devolatilized at 70° C. Then, 1,7-octadiene (309 mL, 230 g, 2.09 mol) and acetonitrile (309 mL) were added, and triamine was further added, followed by stirring and heating at 70° C.

The amount of the group expressed by general formula (C) present in 1 kg of the vinyl polymer was 101 mmol immediately before the addition of 1,7-octadiene. The average number of the groups expressed by general formula (C) per one molecule of the polymer was calculated from the amount of the group expressed by general formula (C) and the number average molecular weight 16,200 obtained by GPC, and the result was 1.6. After the addition of 1,7-octadiene, the amount of the group expressed by general formula (C) remaining after reaction was 3.0 mmol or less per kilogram of the polymer. The average number of the groups expressed by general formula (C) per one molecule of the polymer was calculated from the amount of the remaining group expressed by general formula (C) and the number average molecular weight 17,100 obtained by GPC, and the result was 0.06 or less. The resulting vinyl polymer obtained by the reaction with 1,7-octadiene was a mixture of a vinyl polymer having the group expressed by general formula (C) and a vinyl polymer having the group expressed by general formula (D). The ratio of the group expressed by general formula (C) to the group expressed by general formula (D) obtained from the calculation equation was 0.03 or less.

(Removal of Polymerization Catalyst)

The reaction mixture was heated for devolatilization and diluted with toluene. The mixture was allowed to flow through an activated alumina column to remove the polymerization catalyst. The polymer solution was concentrated and dissolved with 100 parts of toluene relative to the polymer. Then, 4 parts of an adsorbent (Kyowaad 500SH, 2 parts/Kyowaad 700SL, 2 parts, both produced by Kyowa Chemical Industry) was added, followed by heating and stirring in the presence of oxygen. Insoluble contents were removed, and the polymer solution was concentrated to yield a targeted polymer (polymer [3]).

(Physical Properties of Polymer)

Polymer [3] had a number average molecular weight of 17,500 and a molecular weight distribution of 1.15. The amount of bromine in polymer [3] obtained by elementary analysis was 4,800 mg per kilogram of the polymer.

COMPARATIVE EXAMPLE 2

Dehalogenation of Copolymer 1: Treatment at 130° C.

Polymer [3] prepared in Preparation Example 3 was heated for devolatilization (reduced pressure: 10 Torr or less) at 130° C. for 6 hours to yield a polyacrylic ester copolymer containing an ethylenically unsaturated group having a reduced amount of bromine. The amount of bromine in the polymer obtained by elementary analysis was 3,500 mg per kilogram of the polymer. The number average molecular weight was 17,500 and the molecular weight distribution was 1.15.

EXAMPLE 5

Dehalogenation of Copolymer 3: Treatment at 180° C.

Polymer [3] prepared in Example 3 was heated for devolatilization (reduced pressure: 10 Torr or less) at 180° C. for 6 hours to yield a polyacrylic ester copolymer containing an ethylenically unsaturated group having a reduced amount of bromine. The amount of bromine in the polymer obtained by elementary analysis was 470 mg per kilogram of the polymer. The number average molecular weight was 17,600 and the molecular weight distribution was 1.15.

PREPARATION EXAMPLE 4

Transformation into a γ-bromo Ester Structure with 1,7-octadiene 2-2

A targeted polymer (polymer [4]) was prepared through the same operations as in Preparation Example 3 (polymerization of n-butyl acrylate, ethyl acrylate, and 2-methoxyethyl acrylate, reaction with 1,7-octadiene, and removal of polymerization catalyst).

(Physical Properties of Polymer)

Polymer [4] had a number average molecular weight of 17,400 and a molecular weight distribution of 1.16. The amount of bromine in polymer [4] obtained by elementary analysis was 3,100 mg per kilogram of the polymer. The number of ethylenically unsaturated groups introduced to one molecule of the polymer was 1.8.

EXAMPLE 6

Dehalogenation of Copolymer 4: Treatment at 200° C.

Polymer [4] prepared in Preparation Example 4 was heated for devolatilization (reduced pressure: 10 Torr or less) at 200° C. for 3 hours to yield a polyacrylic ester copolymer containing an ethylenically unsaturated group having a reduced amount of bromine. The amount of bromine in the polymer obtained by elementary analysis was 190 mg per kilogram of the polymer. The number average molecular weight was 17,700 and the molecular weight distribution was 1.19.

EXAMPLE 7

Dehalogenation at 180° C. Under Hermetic Conditions

Polymer [1] prepared in Preparation Example 1 was heated at 180° C. for 12 hours (in hermetically closed system). The polymer was heated for devolatilization at 120° C. for 2 hours to evaporate a free bromine compound, and thus a polymer containing an ethylenically unsaturated group having a reduced amount of bromine was obtained. The amount of bromine in the polymer obtained by elementary analysis was 820 mg per kilogram of the polymer.

EXAMPLE 8

Dehalogenation at 180° C. Under a Reduced Pressure of 100 Torr

Polymer [4] prepared in Preparation Example 4 was heated for devolatilization (reduced pressure: 100 Torr) at 180° C. for 12 hours to yield a copolymer containing an ethylenically unsaturated group having a reduced amount of bromine. The amount of bromine in the polymer obtained by elementary analysis was 540 mg per kilogram of the polymer.

EXAMPLE 9

Dehalogenation in the Presence of an Adsorbent

Polymer [2] (100 parts) prepared in Preparation Example 2 and 13 parts of an adsorbent (Kyowaad 500SH, 3 parts/Kyowaad 700SL, 10 parts: both produced by Kyowa Chemical Industry) were blended and heated at 150° C. for 5 hours in an atmosphere of air. The polymer was diluted with toluene. After removing solid contents, the solution was concentrated to yield poly(n-butyl acrylate) containing an ethylenically unsaturated group having a reduced amount of bromine. The amount of bromine in the polymer obtained by elementary analysis was 800 mg per kilogram of the polymer.

EXAMPLE 10

Introduction of a Hydrolyzable Silyl Group into Polymer 1 (Treated at 235° C.)

Compounded were the polymer prepared in Example 4, dimethoxymethylsilane (3 mole equivalents relative to the ethylenically unsaturated group), methyl orthoformate (3 mole equivalents relative to the ethylenically unsaturated group), and a platinum catalyst [solution of bis(1,3-divinyl-1,1,3,3-tetramethyldisiloxane) platinum complex in xylene, hereinafter referred to as platinum catalyst] (10 mg per kilogram of the polymer, in terms of platinum). The mixture was heated and stirred at 80° C. for 1 hour in an atmosphere of nitrogen. After ensuring that the ethylenically unsaturated group disappeared, the reaction mixture was concentrated to yield a targeted polymer containing a methoxysilyl group. The number average molecular weight was 26,600 and the molecular weight distribution was 1.41.

According to a storage stability test for the methoxysilyl group-containing polymer, the rate of change in viscosity was 10%, and the polymer thus exhibited good storage stability.

EXAMPLE 11

Introduction of a Hydrolyzable Silyl Group into Polymer 2 (Treated at 180° C.)

(Dehalogenation)

Polymer [2] prepared in Preparation Example 2 was heated for devolatilization (reduced pressure: 10 Torr or less) at 180° C. for 12 hours to yield a polymer containing an ethylenically unsaturated group having a reduced amount of bromine.

(Purification of Polymer)

Blended were 100 parts of the polymer above, 6 parts of an adsorbent (Kyowaad 500SH, 3 parts/Kyowaad 700SL, 3 parts: both produced by Kyowa Chemical Industry), and 100 parts of xylene. The mixture was heated and stirred at 130° C. for 5 hours in an atmosphere of air. The mixture was diluted with toluene. After removing solid contents, the solution was concentrated to yield a polymer.

(Hydrosilylation)

Compounded were the resulting polymer, dimethoxymethylsilane (3 mole equivalents relative to the ethylenically unsaturated group), methyl orthoformate (3 mole equivalents relative to the ethylenically unsaturated group), and a platinum catalyst (10 mg per kilogram of the polymer, in terms of platinum). The mixture was heated and stirred at 80° C. for 3 hours in an atmosphere of nitrogen. After ensuring that the ethylenically unsaturated group disappeared, the reaction mixture was concentrated to yield a targeted polymer containing a methoxysilyl group. The number average molecular weight was 27,000 and the molecular weight distribution was 1.40. The number of silyl groups introduced to one molecule of the polymer was 1.8.

According to a storage stability test for the methoxysilyl group-containing polymer, the rate of change in viscosity at 80° C. for 7 days was 10%, and the polymer thus exhibited good storage stability.

COMPARATIVE EXAMPLE 3

(Dehalogenation: Substitution Using Acetic Acid K)

Polymer [2] (100 parts) prepared in Preparation Example 2, potassium acetate (1.7 parts), and N,N-dimethylacetamide (100 parts) were compounded. The mixture was heated and stirred at 100° C. for 8 hours under nitrogen flow. The N,N-dimethylacetamide was removed by evaporation under reduced pressure to yield a mixture. The amount of bromine remaining in the polymer was 100 mg or less per kilogram of the polymer.

(Purification of Polymer)

Blended were the resulting mixture and 10 parts of an adsorbent (5 parts of Kyowaad 500SH/5 parts of Kyowaad 700SL relative to 100 parts of the polymer: both produced by Kyowa Chemical Industry). The mixture was heated and stirred at 150° C. for 5 hours in an atmosphere of a mixture of oxygen and nitrogen gases. Insoluble contents (KBr and surplus potassium acetate) were removed, and the mixture was concentrated to yield a polymer.

(Hydrosilylation)

Compounded were the purified polymer, dimethoxymethylsilane (3 mole equivalents relative to the ethylenically unsaturated group), methyl orthoformate (3 mole equivalents relative to the ethylenically unsaturated group), and a platinum catalyst (30 mg per kilogram of the polymer, in terms of platinum). The mixture was heated and stirred at 80° C. for 1 hour in an atmosphere of nitrogen. After ensuring that the ethylenically unsaturated group disappeared, the reaction mixture was concentrated to yield a targeted polymer containing a methoxysilyl group. The number average molecular weight was 28,600 and the molecular weight distribution was 1.45.

According to a storage stability test for the methoxysilyl group-containing polymer, the polymer gelated after heating storage at 80° C. for 3 days. The polymer exhibited seriously low storage stability.

COMPARATIVE EXAMPLE 4

(Repurification of Polymer)

The polymer purified in Comparative Example 3 (100 parts) and 30 parts of an adsorbent (Kyowaad 500SH, 20 parts/Kyowaad 700SL, 10 parts: both produced by Kyowa Chemical Industry) were blended. The mixture was heated and stirred at 150° C. for 5 hours in an atmosphere of a mixture of oxygen and nitrogen gases. Insoluble contents (KBr and surplus potassium acetate) were removed, and the mixture was concentrated to yield a polymer.

(Hydrosilylation)

Compounded were the repurified polymer, dimethoxymethylsilane (3 mole equivalents relative to the ethylenically unsaturated group), methyl orthoformate (3 mole equivalents relative to the ethylenically unsaturated group), and a platinum catalyst (30 mg per kilogram of the polymer, in terms of platinum). The mixture was heated and stirred at 80° C. for 1 hour in an atmosphere of nitrogen. After ensuring that the ethylenically unsaturated group disappeared, the reaction mixture was concentrated to yield a targeted polymer containing a methoxysilyl group.

According to a storage stability test for the methoxysilyl group-containing polymer, the rate of change in viscosity was 11% after storage at 80° C. for 7 days. For enhancing the storage stability, purification using a large amount of adsorbent was required.

EXAMPLE 12

Introduction of a Hydrolyzable Silyl Group into Polymer 3 (Copolymerization, 180° C.)

(Dehalogenation)

Polymer [4] prepared in Preparation Example 4 was heated for devolatilization (reduced pressure: 20 Torr or less) at 180° C. for 12 hours The amount of bromine remaining in the polymer after dehalogenation was 390 mg per kilogram of the polymer.

(Purification of Polymer)

The polymer (100 parts) was dissolved in toluene (100 parts). Into the solution were added 6 parts of an adsorbent (Kyowaad 500SH, 3 parts/Kyowaad 700SL, 3 parts: both produced by Kyowa Chemical Industry) and a hindered phenol antioxidant (Irganox 1010, produced by Ciba Specialty Chemicals, 0.1 part). The mixture was heated and stirred at 130° C. for 5 hours in an atmosphere of a mixture of oxygen and nitrogen gases. After removing insoluble contents, the solution was concentrated to yield a polymer containing an ethylenically unsaturated group.

(Hydrosilylation)

Compounded were the purified polymer, dimethoxymethylsilane (3 mole equivalents relative to the ethylenically unsaturated group), methyl orthoformate (3 mole equivalents relative to the ethylenically unsaturated group), and a platinum catalyst (30 mg per kilogram of the polymer, in terms of platinum). The mixture was heated and stirred at 80° C. for 1 hour in an atmosphere of nitrogen. After ensuring that the ethylenically unsaturated group disappeared, the reaction mixture was concentrated to yield a targeted polymer containing a methoxysilyl group. The number average molecular weight was 18,600 and the molecular weight distribution was 1.22. The number of silyl groups introduced to one molecule of the polymer was 1.7.

According to a storage stability test for the methoxysilyl group-containing polymer, the rate of change in viscosity at 80° C. for 7 days was 18%, and the polymer thus exhibited good storage stability.

EXAMPLE 13

Introduction of a Hydrolyzable Silyl Group into Polymer 4 (Copolymerization, 180° C.)

(Purification of Polymer)

Into the copolymer (100 parts) containing an ethylenically unsaturated group, dehalogenated in Example 8 were added a hindered phenol antioxidant (Irganox 1010, produced by Ciba Specialty Chemicals, 0.1 part) and 6 parts of an adsorbent (Kyowaad 500SH, 3 parts/Kyowaad 700SL, 3 parts: both produced by Kyowa Chemical Industry). The mixture was heated at 130° C. for 5 hours in an atmosphere of air. The mixture was diluted with toluene and insoluble contents were removed. Then, the solution was concentrated to yield a polymer containing an ethylenically unsaturated group.

(Hydrosilylation)

Compounded were the purified polymer, dimethoxymethylsilane (3 mole equivalents relative to the ethylenically unsaturated group), methyl orthoformate (3 mole equivalents relative to the ethylenically unsaturated group), and a platinum catalyst (30 mg per kilogram of the polymer, in terms of platinum). The mixture was heated and stirred at 80° C. for 1 hour in an atmosphere of nitrogen. After ensuring that the ethylenically unsaturated group disappeared, the reaction mixture was concentrated to yield a targeted polymer containing a methoxysilyl group. The number average molecular weight was 19,000 and the molecular weight distribution was 1.23.

EXAMPLE 14

(Synthesis of Polymer Containing an Ethylenically Unsaturated Group: Polymerization, Halogen Conversion, Dehalogenation)

A reaction mixture was prepared through the same operations as in Preparation Example 1 (polymerization of n-butyl acrylate and reaction with 1,7-octadiene). The reaction mixture was heated for devolatilization. The mixture was diluted with 100 parts of methylcyclohexane relative to 100 parts of the polymer. Then, 4 parts of an adsorbent (Kyowaad 500SH, 2 parts/Kyowaad 700SL, 2 parts, both produced by Kyowa Chemical Industry) was added relative to 100 parts of the polymer, followed by heating and stirring at 150° C. in an atmosphere of a mixture of oxygen and nitrogen gases. Insoluble contents were removed and the solution was concentrated. Then, the solution was heated for devolatilization (reduced pressure, 20 Torr or less) at 180° C. for 12 hours to yield a polymer containing an ethylenically unsaturated group.

(Purification of Polymer)

Into the polymer containing an ethylenically unsaturated group (100 parts) were added a hindered phenol antioxidant (Irganox 1010, produced by Ciba Specialty Chemicals, 0.05 part) and 6 parts of an adsorbent (Kyowaad 500SH, 3 parts/Kyowaad 700SL, 3 parts: both produced by Kyowa Chemical Industry). The mixture was heated and stirred at 130° C. for 5 hours in an atmosphere of a mixture of oxygen and nitrogen gases. After removing insoluble contents, the solution was concentrated to yield a polymer.

(Hydrosilylation)

Compounded were the purified polymer, dimethoxymethylsilane (3 mole equivalents relative to the ethylenically unsaturated group), methyl orthoformate (3 mole equivalents relative to the ethylenically unsaturated group), and a platinum catalyst (30 mg per kilogram of the polymer, in terms of platinum). The mixture was heated and stirred at 80° C. for 1 hour in an atmosphere of nitrogen. After ensuring that the ethylenically unsaturated group disappeared, the reaction mixture was concentrated to yield a targeted polymer containing a methoxysilyl group. The number average molecular weight was 25,600 and the molecular weight distribution was 1.35.

According to a storage stability test for the methoxysilyl group-containing polymer, the rate of change in viscosity at 80° C. for 7 days was 7%, and the polymer thus exhibited good storage stability.

EXAMPLE 15

Curable Composition 1

The polymer dehalogenated in Example 4 in a proportion of 100 parts was blended with 3.3 parts of chain siloxane (having an average number of 5 hydrosilyl groups and an average number of 5 substituents [—$CH_2$—$CH(CH_3)$—$C_6H_5$] in its molecule, and 3.70 mmol/g of the Si—H group). A platinum catalyst ($10^{-4}$ to $10^{-3}$ mole equivalent relative to the ethylenically unsaturated group, in terms of platinum) was added to the mixture and uniformly blended. On heating to 130° C., the mixture was rapidly cured to yield a rubber-like cured material.

EXAMPLE 16

Curable Composition 1-2

The polymer prepared in Example 11 in a proportion of 100 parts was blended with 3.3 parts of chain siloxane (having an average number of 5 hydrosilyl groups and an average number of 5 substituents [—$CH_2$—$CH(CH_3)$—$C_6H_5$] in its molecule, and 3.70 mmol/g of the Si—H group). A platinum catalyst ($10^{-4}$ to $10^{-3}$ mole equivalent relative to the ethylenically unsaturated group, in terms of platinum) was added to the mixture and uniformly blended. On heating to 130° C., the mixture was rapidly cured to yield a rubber-like cured material.

EXAMPLE 17

Curable Composition 2

Blended were 100 parts of the polymer containing a methoxysilyl group prepared in Example 10, 150 parts of calcium carbonate (Hakuenka CCR, produced by Shiraishi Kogyo), and 50 parts of DOP (dioctyl phthalate, produced by Kyowa Hakko Kogyo). After being fully blended with a triple paint roll, the mixture was cured with a tetravalent Sn catalyst (dibutyltin diacetylacetonate) at room temperature for 2 days and then at 50° C. for 3 days to yield a cured material in a sheet form. The tensile properties of the cured material were evaluated (using an autograph produced by Shimadzu Corporation, measuring temperature: 23° C., tensile speed: 200 mm/sec, 2(⅓) dumbbell-shaped specimen). The fracture strength was 0.92 MPa, and the fracture elongation was 450%.

EXAMPLE 18

Curable Composition 2-2

Blended were 100 parts of the polymer containing a methoxysilyl group prepared in Example 14, 150 parts of calcium carbonate (Hakuenka CCR, produced by Shiraishi Kogyo), and 50 parts of DOP (dioctyl phthalate, produced by Kyowa Hakko Kogyo). After being fully blended with a triple paint roll, the mixture was cured with a tetravalent Sn catalyst (dibutyltin diacetylacetonate) at room temperature for 2 days and then at 50° C. for 3 days to yield a cured material in a sheet form. The tensile properties of the cured material were evaluated (using an autograph produced by Shimadzu Corporation, measuring temperature: 23° C., tensile speed: 200 mm/sec, 2(⅓) dumbbell-shaped specimen). The fracture strength was 0.96 MPa, and the fracture elongation was 420%.

EXAMPLE 19

Curable Composition 2-3

Blended were 100 parts of the polymer containing a methoxysilyl group prepared in Example 12, 150 parts of calcium carbonate (Hakuenka CCR, produced by Shiraishi Kogyo), and 50 parts of DOP (dioctyl phthalate, produced by Kyowa Hakko Kogyo). After being fully blended with a triple paint roll, the mixture was cured with a tetravalent Sn catalyst (dibutyltin diacetylacetonate) at room temperature for 2 days and then at 50° C. for 3 days to yield a cured material in a sheet form. The tensile properties of the cured material were evaluated (using an autograph produced by Shimadzu Corporation, measuring temperature: 23° C., tensile speed: 200 mm/sec, 2(⅓) dumbbell-shaped specimen). The fracture strength was 0.96 MPa, and the fracture elongation was 256%.

PREPARATION EXAMPLE 5

(Polymerization of n-butyl Acrylate)

CuBr (4.2 parts) and acetonitrile (27.3 parts) were placed in a reactor equipped with a stirrer and stirred at 65° C. for 15 minutes in an atmosphere of nitrogen. Into the reactor were added n-butyl acrylate (100 parts), diethyl 2,5-dibromoadipate (8.8 parts), and acetonitrile (16.6 parts), and the mixture was fully bended by stirring. Pentamethyldiethylenetriamine (0.17 part) was added to start polymerization. n-butyl acrylate (400 parts) was continuously dripped with heating at 70° C. Another portion of the triamine (0.68 part) was further added during dripping the n-butyl acrylate.

(Introduction Reaction of an Alkenyl Group into Vinyl Polymer)

At the point where the monomer reaction rate reached 96%, the remaining monomer and acetonitrile were devolatilized at 80° C. Then, 1,7-octadiene (53.7 parts) and acetonitrile (132 parts), and triamine (1.69 parts) were added, followed by stirring and heating at 70° C. Thus, a mixture containing a polymer having an alkenyl group was obtained.

(Rough Removal of Polymerization Catalyst)

The acetonitrile and unreacted 1,7-octadiene in the mixture were heated for devolatilization, and the mixture was diluted with methylcyclohexane. The insoluble polymerization catalyst was precipitated by centrifuge and removed. Into the polymer solution in methylcyclohexane was added 4 parts of an adsorbent (Kyowaad 500SH, 2 parts/Kyowaad 700SL, 2 parts, both produced by Kyowa Chemical Industry) relative to 100 parts of the polymer, followed by heating and stirring in an atmosphere of a mixture of oxygen and nitrogen gases. Insoluble contents were removed, and the polymer solution was concentrated to yield a polymer (polymer [5]) having an alkenyl group.

Polymer [5] had a number average molecular weight of 24,700 and a molecular weight distribution of 1.32. The amount of bromine in polymer [5] obtained by elementary analysis was 3,400 mg per kilogram of the polymer. The number of alkenyl groups introduced to one molecule of the polymer was 1.7.

COMPARATIVE EXAMPLE 5

(Evaluation of Hydrosilylation Activity)

Blended were 100 parts of polymer [5] prepared in Preparation Example 5 and 3.3 parts of a chain siloxane having an average number of 5 hydrosilyl groups in its molecule (Si—H group, 3.70 mmol/g) prepared by modification in which part of the hydrosilyl groups of a chain siloxane having an average of 10 hydrosilyl groups in its molecule was allowed to react with a-methylstyrene. A platinum catalyst was added to the mixture and uniformly blended, and the mixture was heated to 130° C. The amount of the platinum catalyst when the gelating time was 30 seconds was 5×10$^{-3}$ equivalent in terms of platinum, relative to the alkenyl group. The results are shown in Table 1.

COMPARATIVE EXAMPLE 6

(Insoluble Contents Removal Step Only)

Polymer [5] prepared in Preparation Example 5 in a proportion of 100 parts was diluted with 400 parts of toluene. The solution was filtered through a cerite layer to remove insoluble contents. The filtrate was concentrated to yield a polymer.

(Evaluation of Hydrosilylation Activity)

The hydrosilylation activity of the resulting polymer was evaluated in the same manner as in Comparative Example 5.

EXAMPLE 20

(Dehalogenation Step)

Polymer [5] prepared in Preparation Example 5 was heated for devolatilization (reduced pressure: 10 Torr or less) at 180° C. for 12 hours with stirring. The amount of bromine in the polymer obtained by elementary analysis was 260 mg per kilogram of the polymer.

(Insoluble Contents Removal Step)

The polymer obtained in the foregoing step in a proportion of 100 parts was diluted with 400 parts of toluene. The solution was filtered through a cerite layer to remove insoluble contents. The filtrate was concentrated to yield a polymer.

(Evaluation of Hydrosilylation Activity)

The hydrosilylation activity of the resulting polymer was evaluated in the same manner as in Comparative Example 5.

For the polymer obtained through the dehalogenation step, the amount of the platinum catalyst when the gelating time was 30 seconds was 9×10$^{-4}$ equivalent in terms of platinum, relative to the alkenyl group.

For the polymer obtained further through the insoluble content removal step, the amount of the platinum catalyst when the gelating time was 30 seconds was 2×10$^{-4}$ equivalent in terms of platinum, relative to the alkenyl group.

The results are shown in Table 1.

EXAMPLE 21

(Dehalogenation Step)

Polymer [5] prepared in Preparation Example 5 was heated for devolatilization (reduced pressure: 10 Torr or less) at 200° C. for 3 hours with stirring. The amount of bromine in the polymer obtained by elementary analysis was 280 mg per kilogram of the polymer.

(Insoluble Contents Removal Step)

The polymer obtained in the foregoing step in a proportion of 100 parts was diluted with 400 parts of toluene. The solution was filtered through a cerite layer to remove insoluble contents. The filtrate was concentrated to yield a polymer.

(Evaluation of Hydrosilylation Activity)

The hydrosilylation activity of the polymer obtained through the dehalogenation step and the insoluble content removal step was evaluated in the same manner as in Comparative Example 5.

For the polymer obtained through the dehalogenation step, the amount of the platinum catalyst when the gelating time was 30 seconds was 9×10$^{-4}$ equivalent in terms of platinum, relative to the alkenyl group.

For the polymer obtained further through the insoluble content removal step, the amount of the platinum catalyst when the gelating time was 30 seconds was 1×10$^{-4}$ equivalent in terms of platinum, relative to the alkenyl group.

The results are shown in Table 1.

EXAMPLE 22

(Dehalogenation Step)

Polymer [5] prepared in Preparation Example 5 was heated for devolatilization (reduced pressure: 10 Torr or less) at 235° C. for 3 hours with stirring. The amount of bromine in the polymer obtained by elementary analysis was 100 mg or less per kilogram of the polymer.

(Insoluble Contents Removal Step)

The polymer obtained in the foregoing step in a proportion of 100 parts was diluted with 400 parts of toluene. The solution was filtered through a cerite layer to remove insoluble contents. The filtrate was concentrated to yield a polymer.

(Evaluation of Hydrosilylation Activity)

The hydrosilylation activity of the polymer obtained through the dehalogenation step and the insoluble content removal step was evaluated in the same manner as in Comparative Example 5.

For the polymer obtained through the dehalogenation step, the amount of the platinum catalyst when the gelating time was 30 seconds was 2×10$^{-4}$ equivalent in terms of platinum, relative to the alkenyl group.

For the polymer obtained further through the insoluble content removal step, the amount of the platinum catalyst when the gelating time was 30 seconds was 1×10$^{-4}$ equivalent in terms of platinum, relative to the alkenyl group. The results are shown in Table 1.

TABLE 1

| | Dehalogenation step | | | Insoluble content removal step | Platinum amount (Equivalent) |
|---|---|---|---|---|---|
| | Temperature (° C.) | Time (hr) | Reduced pressure (Torr) | | |
| Comparative Example 5 | untreated | | | untreated | 5.0E−03 |
| Comparative Example 6 | untreated | | | Cerite filtration | 3.0E−03 |
| Example 20 | 180 | 12 | 10 or less | Cerite filtration | 2.0E−04 |
| | | | | untreated | 9.0E−04 |
| Example 21 | 200 | 3 | 10 or less | Cerite filtration | 1.0E−04 |
| | | | | untreated | 9.0E−04 |
| Example 22 | 235 | 3 | 10 or less | Cerite filtration | 1.0E−04 |
| | | | | untreated | 2.0E−04 |

In Table 1, the platinum amount refers to the amount of the platinum catalyst when the gelating time is 30 seconds in terms of platinum, relative to the alkenyl group. For example, "5.0E-03" in the table represents "5.0×10$^{-3}$ equivalent".

EXAMPLE 23

(Hydrosilylation: Synthesis of Polymer having a Methoxysilyl Group)

Blended were the polymer obtained through the aftertreatment (step 1 and step 2) of Example 20, dimethoxymethylsilane (3 mole equivalents relative to the alkenyl group), methyl orthoformate (1 mole equivalents relative to the alkenyl group), and a platinum catalyst (10 mg per kilogram of the polymer, in terms of platinum). The mixture was heated and stirred at 80° C. for 0.5 hour in an atmosphere of nitrogen. It was ensured by $^1$H-NMR that the alkenyl group disappeared by a reaction, and the reaction mixture was concentrated to yield a targeted polymer containing a methoxysilyl group. The number average molecular weight was 28,600 and the molecular weight distribution was 1.45. The number of silyl groups introduced to one molecule of the polymer was 1.9.

PREPARATION EXAMPLE 6

A reaction mixture was prepared through the same operations as in Preparation Example 1 (polymerization of n-butyl acrylate and reaction with 1,7-octadiene). The reaction mixture was heated for devolatilization. The reaction mixture was diluted with 100 parts of methylcyclohexane relative to 100 parts of the polymer. Then, 1 part of an adsorbent (Kyowaad 500SH, 0.5 part/Kyowaad 700SL, 0.5 part, both produced by Kyowa Chemical Industry) and 1 part of a filter aid were added relative to 100 parts of the polymer, followed by heating and stirring at 100° C. in an atmosphere of a mixture of oxygen and nitrogen gases. Insoluble contents were removed, and the polymer solution was concentrated at 100° C. to yield polymer [6]. Polymer [6] had a number average molecular weight of 26,000 and a molecular weight distribution of 1.28.

EXAMPLE 24

Polymer [6] prepared in Preparation Example 6 was dehalogenated by heating at 180° C. under reduced pressure for 12 hours. As a result, increase in the molecular weight was observed, and the molecular weight distribution increased (molecular weight distribution, 1.44). The amount of bromine in the resulting polymer obtained by elementary analysis was 950 mg per kilogram of the polymer.

EXAMPLE 25

Polymer [6] prepared in Preparation Example 6 was dehalogenated in the presence of 0.1 part of SUMILIZER GS (produced by Sumitomo Chemical) acting as a carbon radical scavenger relative to 100 parts of the polymer, by heating at 180° C. under reduced pressure for 12 hours. The resulting polymer had a number average molecular weight of 26,100 and a molecular weight distribution of 1.32. Although the molecular weight and molecular weight distribution were increased by dehalogenation in the absence of carbon radical scavenger (Example 24), dehalogenation in the presence of carbon radical scavenger prevented the increase in molecular weight. The amount of bromine in the resulting polymer obtained by elementary analysis was 190 mg per kilogram of the polymer.

PREPARATION EXAMPLE 7

A reaction mixture was prepared through the same operations as in Preparation Example 3 (polymerization of acrylic esters and reaction with 1,7-octadiene). The reaction mixture was heated for devolatilization. The reaction mixture was diluted with 100 parts of methylcyclohexane relative to 100 parts of the polymer. Then, 1 part of an adsorbent (Kyowaad 500SH, 0.5 part/Kyowaad 700SL, 0.5 part, both produced by Kyowa Chemical Industry) and 1 part of a filter aid were added relative to 100 parts of the polymer, followed by heating and stirring at 100° C. in an atmosphere of a mixture of oxygen and nitrogen gases. Insoluble contents were removed, and the polymer solution was concentrated at 100° C. to yield polymer [7]. Polymer [7] had a number average molecular weight of 17,400 and a molecular weight distribution of 1.13.

EXAMPLE 26

Polymer [7] prepared in Preparation Example 7 was dehalogenated in the presence of 2 parts of an adsorbent (Kyowaad 500SH, 1 part/Kyowaad 700SL, 1 part, both produced by Kyowa Chemical Industry) relative to 100 parts of the polymer, by heating at 180° C. under reduced pressure for 12 hours. As a result, increase in the molecular weight was observed, and the molecular weight distribution increased (number average molecular weight: 19,000, molecular weight distribution: 1.36). The amount of bromine in the resulting polymer obtained by elementary analysis was 410 mg per kilogram of the polymer.

EXAMPLE 27

Polymer [7] prepared in Preparation Example 7 was dehalogenated in the presence of 0.1 part of SUMILIZER GS (produced by Sumitomo Chemical) acting as a carbon radical scavenger relative to 100 parts of the polymer and 2 parts of an adsorbent (Kyowaad 500SH, 1 part/Kyowaad 700SL, 1 part, both produced by Kyowa Chemical Industry) relative to 100 parts of the polymer, by heating at 180° C. under reduced pressure for 12 hours. The resulting polymer had a number average molecular weight of 17,600 and a molecular weight distribution of 1.14. Although the molecular weight and molecular weight distribution were increased by dehalogenation in the absence of carbon radical scavenger (Example 26), dehalogenation in the presence of carbon radical scavenger prevented the increase in molecular weight. The amount of bromine in the resulting polymer obtained by elementary analysis was 360 mg per kilogram of the polymer.

INDUSTRIAL APPLICABILITY

According to the present invention, the amount of the halogen contained in a halogen-containing vinyl polymer produced by atom transfer radical polymerization can be reduced in a simple operation with economical efficiency. Consequently, the storage stability of the polymer and curable compositions containing the polymer can be enhanced, and reaction equipment and various materials in contact with the polymer can be prevented from corroding. In particular, storage stability can be largely enhanced in polymers having a crosslinkable silyl group.

The invention claimed is:

1. A vinyl polymer prepared by a process for preparing a vinyl polymer containing halogen atoms in an amount of 1,000 mg or less per kilogram, the process comprising (a) producing a vinyl polymer containing halogen by atom transfer radical polymerization of a vinyl monomer; and (b) dehalogenating the vinyl polymer containing the halogen by heating the vinyl polymer containing the halogen at a temperature in the range of 140 to 250° C., wherein the dehalogenation step is performed by promoting an intramolecular cyclization reaction of the vinyl polymer containing the halogen produced by the atom transfer radical polymerization of the vinyl monomer, and the intramolecular cyclization reaction forms a lactone ring.

2. The vinyl polymer according to claim 1, wherein the vinyl polymer has a number average molecular weight in the range of 1,000 to 100,000.

3. The vinyl polymer according to claim 1, wherein the molecular weight distribution (weight average molecular weight/number average molecular weight) of the vinyl polymer is in the range of 1.05 to 1.50.

4. The vinyl polymer according to claim 1, wherein the vinyl polymer has an ethylenically unsaturated group in the molecule thereof.

5. A hydrosilylation-reactive curable composition containing the vinyl polymer as set forth in claim 1.

6. A vinyl polymer having a silyl group in the molecule thereof, the vinyl polymer being prepared by allowing the ethylenically unsaturated group of the vinyl polymer as set forth in claim 4 to react with a compound containing a hydrosilyl group.

7. The vinyl polymer having a silyl group in the molecule thereof according to claim 6, wherein the vinyl polymer has a number average molecular weight in the range of 1,000 to 100,000.

8. The vinyl polymer having a silyl group in the molecule thereof according to claim 6, wherein the molecular weight distribution (weight average molecular weight/number average molecular weight) of the vinyl polymer is in the range of 1.05 to 1.50.

9. A curable composition containing the vinyl polymer having a silyl group in the molecule thereof as set forth in claim 6.

* * * * *